US012057555B2

(12) United States Patent
Wang et al.

(10) Patent No.: US 12,057,555 B2
(45) Date of Patent: Aug. 6, 2024

(54) MULTIPLE-ELECTRON AQUEOUS BATTERY

(71) Applicants: University of Maryland, College Park, College Park, MD (US); U.S. ARMY RESEARCH LABORATORY, Adelphi, MD (US)

(72) Inventors: Chunsheng Wang, Silver Spring, MD (US); Kang Xu, Potomac, MD (US); Liumin Suo, Greenbelt, MD (US)

(73) Assignees: University of Maryland; U.S. Army Research Laboratory

(*) Notice: Subject to any disclaimer, the term of this patent is extended or adjusted under 35 U.S.C. 154(b) by 0 days.

(21) Appl. No.: 15/114,997

(22) PCT Filed: Jan. 28, 2015

(86) PCT No.: PCT/US2015/013322

§ 371 (c)(1),
(2) Date: Jul. 28, 2016

(87) PCT Pub. No.: WO2015/116700

PCT Pub. Date: Aug. 6, 2015

(65) Prior Publication Data

US 2016/0351968 A1 Dec. 1, 2016

Related U.S. Application Data

(60) Provisional application No. 61/932,556, filed on Jan. 28, 2014.

(51) Int. Cl.

| | |
|---|---|
| ***H01M 10/36*** | (2010.01) |
| ***H01M 4/46*** | (2006.01) |

(Continued)

(52) U.S. Cl.
CPC .......... *H01M 10/36* (2013.01); *H01M 4/466* (2013.01); *H01M 4/48* (2013.01); *H01M 4/485* (2013.01);

(Continued)

(58) Field of Classification Search
CPC ......... H01M 4/466; H01M 4/48; H01M 10/36

(Continued)

(56) References Cited

U.S. PATENT DOCUMENTS 5,204,195 A * 4/1993 Tomantschger ...... H01M 4/134 429/224
5,900,336 A * 5/1999 Kabata .................. H01M 4/364 429/231.4

(Continued)

FOREIGN PATENT DOCUMENTS

CN 103219542 A * 7/2013
JP 03114144 A 5/1991

(Continued)

OTHER PUBLICATIONS

Freezing Saltwater 2012.*

(Continued)

*Primary Examiner* — Ula C Ruddock
*Assistant Examiner* — Anna Korovina
(74) *Attorney, Agent, or Firm* — Don D. Cha; HDC Intellectual Property Law, LLP

(57) ABSTRACT

The present invention is directed to a hybrid high voltage aqueous electrolyte battery that combines $Ni/Mg_2NiH_4$ and Mg-ion rechargeable battery chemistries. The hybrid aqueous electrolyte battery can be used for plug-in hybrid electrical vehicles and electric vehicles.

19 Claims, 34 Drawing Sheets

Aqueous Mg-ion batteries

Aqueous Mn/MH batteries

(51) Int. Cl.
*H01M 4/48* (2010.01)
*H01M 4/485* (2010.01)

(52) U.S. Cl.
CPC .... *H01M 2200/20* (2013.01); *H01M 2220/20* (2013.01); *H01M 2300/0002* (2013.01)

(58) Field of Classification Search
USPC .......................................................... 429/347
See application file for complete search history.

(56) References Cited

U.S. PATENT DOCUMENTS

| | | | | |
|---|---|---|---|---|
| 6,221,529 | B1 * | 4/2001 | Yasuda | H01M 4/131 429/223 |
| 6,403,253 | B1 * | 6/2002 | Wainwright | H01M 4/48 429/101 |
| 6,645,667 | B1 * | 11/2003 | Iwamoto | H01M 4/13 429/231.95 |
| 7,985,505 | B2 | 7/2011 | Yang et al. | |
| 8,580,422 | B2 | 11/2013 | Whitacre et al. | |
| 2003/0073005 | A1 * | 4/2003 | Kim | H01M 4/5815 429/326 |
| 2010/0141211 | A1 | 6/2010 | Yazami | |
| 2010/0221596 | A1 * | 9/2010 | Huggins | H01M 4/383 429/149 |
| 2012/0219856 | A1 * | 8/2012 | Doe | C01B 25/372 429/211 |
| 2013/0020999 | A1 | 1/2013 | Whitacre | |
| 2013/0108919 | A1 | 5/2013 | Matsui | |
| 2013/0122334 | A1 | 5/2013 | Visco et al. | |
| 2013/0236796 | A1 | 9/2013 | Kim et al. | |
| 2013/0302697 | A1 * | 11/2013 | Wang | B82Y 30/00 429/300 |
| 2014/0075745 | A1 * | 3/2014 | Lu | H01M 4/523 29/623.1 |

FOREIGN PATENT DOCUMENTS

| | | | |
|---|---|---|---|
| JP | 2012504854 A | | 2/2012 |
| JP | 2013254709 A | * | 12/2013 |
| WO | WO 2010/040065 A1 | | 4/2010 |
| WO | WO-2012097457 A1 | * | 7/2012 |

OTHER PUBLICATIONS

Li et al., "Rechargeable Ni-Li Battery Integrated Aqueous/Nonaqueous System", J. Am. Chem. Soc. 2009, 131, 15098-15099, 10.1021/ja906529g.*

Wessels et al., "Investigations of the Electrochemical Stability of Aqueous Electrolytes for Lithium Battery Applications", Electrochem. Solid-State Lett. 2010 vol. 13, issue 5, A59-A6, 10.1149/1.3329652.*

Mizuno et al., JP 2013-254709 Machine Translation (Year: 2013).*

Electrolytes NPL, http://www.science.uwaterloo.ca/~cchieh/cact/c120/electrolyte.html (Year: 2001).*

Perron et al., "Comparison of the thermodynamic and transport properties of lithium bis(trifluoromethylsulfonyl)imide (LiTFSI) with LiClO4 and Bu4NBr in water at 25 ° C", Canadian Journal of Chemistry, 1997, 75(11): 1608-1614, https://doi.org/10.1139/v97-191 (Year: 1997).*

Suo et al., "How Solid-Electrolyte Interphase Forms in Aqueous Electrolytes", J. Am. Chem. Soc. 2017, 139, 18670-18680, includes supporting information, DOI: 10.1021/jacs.7b10688 (Year: 2017).*

Mizuno et al. (JP 2013-254709), Manual Translation (Year: 2013).*

Hu et al., CN-103219542 Machine Translation (Year: 2013).*

Aravindan, V., et al., "Carbon Coated Nano-$LiTi_2(PO_4)_3$ Electrodes for Non-aqueous Hybrid Supercapacitors," Physical Chemistry Chemical Physics 14:5808-5814, Royal Society of Chemistry, England (2012).

Armand, M. and Tarascon, J-M., "Building Better Batteries," Nature 451:652-657, Nature Publishing Group, England (2008).

Arthur, T.S., et al., "Electrodeposited Bi, Sb and $Bi_{1-x}Sb_x$, Alloys as Anodes for Mg-ion Batteries," Electrochemistry Communications 16:103-106, Elsevier B.V., Netherlands (2012).

Bogle, X., et al., "Understanding $Li^+$-Solvent Interaction in Nonaqueous Carbonate Electrolytes with $^{17}O$ NMR," The Journal of Physical Chemistry Letters 4:1664-1668, American Chemical Society, United States (2013).

Chen, L., et al., "High-voltage Aqueous Battery Approaching 3 V using an Acidic-alkaline Double Electrolyte," Chemical Communications 49:2204-2206, Royal Society of Chemistry, England (2013).

Duduta, M., et al., "Semi-Solid Lithium Rechargeable Flow Battery," Advanced Energy Materials 1:511-516, WILEY-VCH Verlag GmbH & Co. KGaA, Germany (2011).

Fic, K., et al., "Novel Insight Into Neutral Medium as Electrolyte for High-voltage Supercapacitors," Energy & Environmental Science 5:5842-5850, Royal Society of Chemistry, England (2012).

Goodenough, J.B. and Kim, Y., "Challenges for Rechargeable Li Batteries," Chemistry of Materials 22:587-603, American Chemical Society, United States (2010).

Guo, Y-S., et al., "Boron-based Electrolyte Solutions With Wide Electrochemical Windows for Rechargeable Magnesium Batteries," Energy & Environmental Science 5:9100-9106, Royal Society of Chemistry, England (2012).

He, L., et al., "Synthesis and electrochemical performance of spinel-type $LiMn_2O_4$ using γ-MnOOH rods as self-template for lithium ion battery," Journal of Power Sources 220:228-235, Elsevier B.V., Netherlands (2012).

Imamura, D., et al., "Mg Intercalation Properties into $V_2O_5$ Gel/Carbon Composites under High-rate Condition," Journal of The Electrochemical Society 150(6):A753-A758, The Electrochemical Society, Inc., United States (2003).

International Search Report for International Application No. PCT/US2015/013322, ISA/US, Commissioner for Patents, United States, mailed on May 6, 2015, 3 pages.

Kong, Y., et al., "A Battery Composed of a Polypyrrole Cathode and a Magnesium Alloy Anode-Toward a Bioelectric Battery," Synthetic Metals 162:584-589, Elsevier B.V., Netherlands (2012).

Levi, E., et al., "A Review on the Problems of the Solid State Ions Diffusion in Cathodes for Rechargeable Mg Batteries," Journal of Electroceramics 22:13-19, Springer Science + Business Media, LLC, United States (2009).

Li, W., et al., "Lithium Intercalation from Aqueous Solutions," Journal of The Electrochemical Society 141(9):2310-2316, The Electrochemical Society, Inc., United States (1994).

Li, W., et al., "Rechargeable Lithium Batteries with Aqueous Electrolytes," Science 264:1115-1118, American Association for the Advancement of Science, United States (1994).

Liang, Y., et al., "Rechargeable Mg Batteries with Graphene-like $MoS_2$ Cathode and Ultrasmall Mg Nanoparticle Anode," Advanced Materials 23:640-643, WILEY-VCH Verlag GmbH & Co. KGaA, Germany (2011).

Liu, Y., et al., "Advanced Hydrogen Storage Alloys for Ni/MH Rechargeable Batteries," Journal of Materials Chemistry 21:4743-4755, Royal Society of Chemistry, England (2011).

Luo, J-Y., et al., "Raising the cycling stability of aqueous lithium-ion batteries by eliminating oxygen in the electrolyte," Nature Chemistry 2:760-765, Macmillan Publishers Limited, England (2010).

Luo, J-Y. and Xia, Y-Y., "Aqueous Lithium-ion Battery $LiTi_2(PO_4)_3$/$LiMn_2O_4$ with High Power and Energy Densities as well as Superior Cycling Stability," Advanced Functional Materials 17:3877-3884, WILEY-VCH Verlag GmbH & Co. KGaA, Germany (2007).

Marcus, Y., "Effect of Ions on the Structure of Water: Structure Making and Breaking," Chemical Reviews 109:1346-1370, American Chemical Society, United States (2009).

Novak, P., et al., "Magnesium Insertion Electrodes for Rechargeable Nonaqueous Batteries—A Competitive Alternative to Lithium?" Electrochimica Acta 45:351-367, Elsevier Science Ltd., England (1999).

Ohtaki, H, and Radnai, T., "Structure and Dynamics of Hydrated Ions," Chemical Reviews 93:1157-1204, American Chemical Society, United States (1993).

(56) References Cited

OTHER PUBLICATIONS

Rasul, S., et al., "High Capacity Positive Electrodes for Secondary Mg-ion Batteries," Electrochimica Acta 82:243-249, Elsevier Ltd., England (2012).
Rasul, S., et al., "Synthesis and Electrochemical Behavior of Hollandite $MnO_2$/acetylene Black Composite Cathode for Secondary Mg-ion Batteries," Solid State Ionics 225:542-546, Elsevier B.V., Netherlands (2012).
Singh, N., et al., "A high energy-density tin anode for rechargeable magnesium-ion batteries," Chemical Communications 49:149-151, Royal Society of Chemistry, England (2013).
Suo, L., et al., "A New Class of Solvent-in-salt Electrolyte for High-energy Rechargeable Metallic Lithium Batteries," Nature Communications 4:1481, with Supplementary Information, Macmillan Publishers Limited, England, 27 pages (2013).
Sutto, T.E. and Duncan, T.T., "Electrochemical and Structural Characterization of Mg Ion Intercalation into $Co_3O_4$ using Ionic Liquid Electrolytes," Electrochimica Acta 80:413-417, Elsevier Ltd., England (2012).
Tang, W., et al., "An Aqueous Rechargeable Lithium Battery of Excellent Rate Capability Based on a Nanocomposite of $MoO_3$ Coated With PPy and $LiMn_2O_4$," Energy & Environmental Science 5:6909-6913, Royal Society of Chemistry, England (2012).
Tao, Z.L., et al., "$TiS_2$ Nanotubes as the Cathode Materials of Mg-ion Batteries," Chemical Communications 18:2080-2081, Royal Society of Chemistry, England (2004).
Tarascon, J-M. and Armand, M., "Issues and Challenges Facing Rechargeable Lithium Batteries," Nature 414:359-367, Nature Publishing Group, England (2001).
Wang, Y., et al., "Recent Progress in Aqueous Lithium-Ion Batteries," Advanced Energy Materials 2:830-840, WILEY-VCH Verlag GmbH & Co. KGaA, Germany (2012).
Whittingham, M.S., "Lithium Batteries and Cathode Materials," Chemical Reviews 104:4271-4301, American Chemical Society, United States (2004).
Winther-Jensen, B., et al., "Control of Magnesium Interfacial Reactions in Aqueous Electrolytes Towards a Biocompatible Battery," Electrochimica Acta 53:5881-5884, Elsevier Ltd., England (2008).
Xu, K., "Nonaqueous Liquid Electrolytes for Lithium-Based Rechargeable Batteries," Chemical Reviews 104:4303-4417, American Chemical Society, United States (2004).
Yan, J., et al., "Rechargeable hybrid aqueous batteries," Journal of Power Sources 216:222-226, Elsevier B.V., Netherlands (2012).
Yin, J., et al., "Concentrated $NaClO_4$ Aqueous Solutions as Promising Electrolytes for Electric Double-layer Capacitors," Journal of Power Sources 196:4080-4087, Elsevier B.V., Netherlands (2011).
Yoo, H.D., et al., "Mg Rechargeable Batteries: An on-going Challenge," Energy & Environmental Science 6:2265-2279, Royal Society of Chemistry, England (2013).
Zhang, R., et al., "$\alpha$-$MnO_2$ as a Cathode Material for Rechargeable Mg Batteries," Electrochemistry Communications 23:110-113, Elsevier B.V., Netherlands (2012).
Zhu, Y. and Wang, C., "Galvanostatic Intermittent Titration Technique for Phase-Transformation Electrodes," The Journal of Physical Chemistry C 114:2830-2841, American Chemical Society, United States (2010).
Zhu, Y. and Wang, C., "Novel CV for Phase Transformation Electrodes," The Journal of Physical Chemistry C 115:823-832, American Chemical Society, United States (2011).
Ding, M.S., et al., "Phase Diagram, Conductivity, and Glass Transition of LiTFSI-$H_2O$ Binary Electrolytes," *J. Phys. Chem. C* 122:16624-16629, American Chemical Society, United States (2018).
Ensling, D., et al., "A comparative XPS surface study of $Li_2FeSiO_4$/C cycled with LiTFSI and $LiPF_6$-based electrolytes," *J. Mater. Chem.* 19:82-88, Royal Society of Chemistry, United Kingdom (2009).
Lux, S.F., et al., "LiTFSI Stability in Water and Its Possible Use in Aqueous Lithium-Ion Batteries: pH Dependency, Electrochemical Window and Temperature Stability," *Journal of the Electrochemical Society*, 160:A1694-A1700, The Electrochemical Society, United States (2013).
Suo, L., et al., "How Solid-Electrolyte Interphase Forms in Aqueous Electrolytes," *J. Am. Chem. Soc.* 139:18670-18680, American Chemical Society, United States (2017).
Wessells, C., et al., "Investigations of the Electrochemical Stability of Aqueous Electrolytes for Lithium Battery Applications," *Electrochemical and Solid-State Letters*, 13:A59-A61, The Electrochemical Society, United States (2010).
Yan, S., et al., "Effect of Salt Additives to the KOH Electrolyte Used in Ni/MH Batteries," *Batteries* 1:54-73, MDPI AG, Switzerland (2015).
1st Office Action of 2nd corresponding Divisional Korean Patent Application No. 10-2022-7032813, dated Oct. 24, 2022.
2nd Office Action of 2nd corresponding Divisional Korean Patent Application No. 10-2022-7032813, dated May 22, 2023.

* cited by examiner

Aqueous Mg-ion batteries

Anode: $Mo_3S_4$

Cathode: $LiMn_2O_4$

MULTIPLE-ELECTRON AQUEOUS BATTERY

STATEMENT REGARDING FEDERALLY SPONSORED RESEARCH OR DEVELOPMENT

This invention was made with government support under DE-AR0000389 awarded by the Department of Energy. The government has certain rights in the invention.

BACKGROUND OF THE INVENTION

Field of the Invention

The present invention is directed to a hybrid high voltage aqueous electrolyte battery that combines Ni/$Mg_2NiH4$ and Mg-ion rechargeable battery chemistries. The hybrid aqueous electrolyte battery can be used for plug-in hybrid electrical vehicles and electric vehicles.

Background

Automotive batteries for hybrid electric vehicles (HEV), plug-in hybrid electric vehicles (PHEV), and battery electric vehicles (BEV) should possess an energy density high enough for a 300 mile-range per charge, cost less than $100/kWh, and be robust, as well as safe, against various abuses experienced on the road. Li-ion batteries (LIB) based on organic non-aqueous electrolytes provide the highest energy density available among all rechargeable systems; however, their high cost and the hazardous nature of the electrolyte systems fail to satisfy the above requirements. To prevent catastrophic thermal runaway, battery management systems using thermal and electronic control on both a cell and pack level have to be employed, which not only increases the cost and but also reduces the overall device energy density. Solid state electrolyte LIBs are relatively safe, but they show low ionic conductivity of the glassy or ceramic solid electrolyte and have inferior (point-to-point) contact between the solid/solid interface as compared with the solid/liquid (surface-to-surface) interface of conventional batteries. Solid state electrolyte LIBs largely restrict the power density of the devices. To cope with the low conductivity (about $10^{-4}$-$10^{-6}$ S/cm), a very thin film (<50 micron) has to be used, which places a limit on the mechanical robustness. In addition, the high interfacial solid/solid resistance between the solid electrode and solid electrolyte continuously deteriorates with charge/discharge cycles, because the large volume change of the two electrodes upon lithiation/delithiation cannot be accommodated by the rigid solid electrolyte with fixed volume. These mechanical strains will eventually lead to failure of the cell configuration.

Solid-state LIBs are fundamentally different from a solid oxide fuel cell (SOFC), where no volume change is expected. This is the inherent reason why the mature ceramic electrolytes from solid-oxide fuel cells cannot be directly borrowed and applied to battery technologies. Thus, the all-solid-state batteries have been limited to the niche market of small format storage units for on-board memory backup, while their deployment as large format automotive batteries remains remote. Flow batteries employing liquid or slurry-based reactants enabled physical isolation of active materials from the cell reaction sites, with improved safety and reduced cost. However, the specific energy density of flow batteries is low, mainly due to limitations of solubility and operating potentials of active materials, as well as the inert mass of infrastructures (reservoirs, pipings, and pumps) (see Duduta, M., et al., *Adv. Energy Mater.* 1:511-516 (2011)). On the other hand, rechargeable batteries using aqueous electrolytes are also intrinsically safe, as exemplified by alkaline nickel/metal-hydride batteries that have been used in hybrid electric vehicles (see Liu, Y., et al., *J. Materials Chem.* 21:4743-4755 (2011)). However, their energy density compared with LIBs still falls below the requirement for an ideal electric vehicle.

The cell voltage of aqueous batteries is confined by the narrow thermodynamic electrochemical stability window of water (1.23 V). However, this window can be increased by kinetically suppressing the evolution of $H_2$ and $O_2$. By increasing the ion solvation in neutral electrolytes (pH=7), the aqueous battery and supercapacitor can usually be charged to 2.0-2.50 V with almost 100% coulombic efficiency and a cycle life of more than 1000 with a low self-discharge rate (see Yang, J., et al., *J. Power Sources* 218:222-236 (2012) and Fic, K., et al., *Energy Environ. Sci.* 5:5842-5850 (2012)). In addition, 2.0 V lead-acid batteries have been commercialized and widely used as starter batteries in automobiles. Although the expanded 2.0-2.5 V voltage of aqueous batteries is still lower than the typical 3.5-4.0 V for LIBs, a comparable energy density could still result with sufficient compensation from capacities.

Compared with their non-aqueous counterparts, aqueous electrolytes have the advantages of low cost, high safety, high conductivity, low viscosity, easy manipulation, and environmental "greenness." The aqueous electrolytes in rechargeable batteries normally use either concentrated acidic or alkaline solution (e.g., 10 M $H_2SO_4$ or 6 M KOH) to achieve maximum ionic conductivity. However, they are too caustic to handle and rather corrosive toward cell packaging materials. Due to the typical high conductivities of aqueous systems, benign neutral aqueous solutions based on safe and highly soluble alkali salts can still meet the requirements of a battery; however, as less corrosive solutions. Thermodynamically, the electrochemical stability window of water does not change with pH value, but the real voltage window of neutral aqueous electrolyte can be expanded more easily. In such a neutral electrolyte, the $H^+/OH^-$ equilibrium is not shifted to favor either species therefore evolution of $H_2$ or $O_2$ could be minimized. In an electrolyte, both cations and anions are associated to water to form solvation shells. The strong solvation allows more water molecules to be strongly associated to cations and anions, thus suppressing their activities in decomposition and consequently enlarging the electrolyte stability voltage window. For example, in a $Li_2SO_4$ electrolyte, $Li^+$ is surrounded by 27 molecules of water, while the sulfate anion, $SO_4^{2-}$, can solvate 17 molecules of water with a large hydration energy—on the order of 160-220 kJ/mol (Fic, supra). In highly concentrated electrolytes, only a few "free" water molecules would remain; hence minimizing the oxidation and reduction, and the aqueous stability window can be largely enlarged. For example, in a 1 M $Li_2SO_4$ electrolyte, the stable electrochemical window of the $Li_2SO_4$ electrolyte can be enlarged to 2.2 V (Fic, supra). The stable electrochemical window of an aqueous $Li_2SO_4$ electrolyte can be further enlarged if a saturated $Li_2SO_4$ electrolyte is used. The solvation capability of different salts has been investigated and might serve as quantification to evaluate their effectiveness in minimizing water decomposition. IL was reported that the solvation capability of alkali metal ions increases with the increase of the ion-solvent complex diameter in the order $K^+<Na^+<Li^+$ (Fic, supra). Among the anions, the sulfate anion, $SO_4^{2-}$, is one of the biggest and strongest solvated inorganic anions, with a desolvation energy of about 108 kJ/ml per one $SO_4^{2-}$—$H_2O$ bond (Fic, supra).

The water activity in an aqueous electrolyte can be further reduced by increasing the salt concentration beyond the saturation value through a "water-in-salt" concept of a solid electrolyte, which has not been reported previously. The "water-salt-electrolyte" is similar to the concepts of "solvent-in-salt" and "polymer-in-salt" that have been proposed. For example, an electrolyte with ultrahigh salt concentration was used in organic electrolyte Li—S batteries in order to suppress lithium dendrite growth and prevent lithium polysulphide dissolution (Suo, L., et al., *Nature Communications* 4:1481 (2013)). In such "solvent-in-salt" electrolytes, the lithium-ion transference numbers were far higher (0.73) than their diluted counterparts although the Li-ion conductivity was shown to be reduced to $10^{-3}$ S/cm. The uniqueness of "water-in-salt" electrolytes is that the disadvantage of lowering the ionic conductivity is not an issue for an aqueous electrolyte because an aqueous electrolyte has a much higher conductivity than an organic electrolyte and the ionic conductivity of an aqueous electrolyte is not very sensitive to the salt concentration. The ionic conductivity of a "water-in-salt" aqueous electrolyte should be higher than that of an organic electrolyte.

With increased salt concentration, the volume of each charge carrier (hydrated ions) will shrink as the hydration number becomes smaller and solvated ions form aggregates. The smaller charge carrier leads to higher conductivity, but their aggregation increases the viscosity, thus retarding the mobility of ions. Overall, concentration changes have only a minor effect on the ionic conductivity of a $Li_2SO_4$ electrolyte. For example, when the concentration of a $Li_2SO_4$ electrolyte increases from 0.1 M to 4 M, the change of ionic conductivity was smaller than 20 mS/cm (i.e., from 30 mS/cm at 0.1 M to 50 mS at 2 M, and 40 mS/cm at 4 M) (Fic, supra). An additional benefit from using a concentrated aqueous electrolyte is the wide service temperature range, which is required for automotive batteries. This was shown by the melting point depression incurred from using $H_2O$-ion interactions (Yin, J., et al., *J. Power Sources* 196:4080-4082 (2011)). Furthermore, a 3 V stable electrochemical window was achieved by using a ceramic lithium super-ionic conductor ($Li_{1+x+y}Al_xTi_{2-x}Si_yP_{3y}O_{12}$ (LATSP)) thin film to separate the acidic electrolyte from the alkaline electrolyte to form an acidic-alkaline double electrolyte junction (Chen, L., et al., *Chem. Commun.* 49:2204-2206 (2013)). However the poor reliability and safety concerns associated with this type of battery limited its application for electric vehicles.

An alternative method to enlarge the stability window of aqueous electrolytes is to employ additive materials that have high overpotentials for either hydrogen-evolution at the anode or oxygen-evolution at the cathode. Pb, Cd, Zn, and Sn are the most effective examples of these additive materials in suppressing hydrogen evolution at negative electrodes, while carbon along with some metal oxides prove useful for suppressing oxygen evolution.

The most successful aqueous batteries are lead-acid batteries and alkaline Ni/MH batteries. However the lead-acid batteries are only used as starter/lighting power sources in most automobiles due to low energy densities (about 10-20 Wh/Kg). Although Ni/MH batteries have higher energy density and have been used as an energy storage component in hybrid electric vehicle power systems, their energy densities are far below those required for electric vehicle applications. In addition, the limited and uneven distribution of rare earth metals globally (a key component in MH electrodes) also raises a concern for national security wherien prices could be manipulated by hostile geopolitical forces.

Mg-based alloys, on the other hand, are very promising hydrogen storage host materials for battery applications, exemplified by $Mg_2NiH_4$, whose theoretical capacity (1001 mAh/g) is almost 3 times higher than that of $AB_5H_6$ (370 mAh/g), and whose abundance in the earth's crust essentially eliminates any concern over sustainability (Liu, supra).

$Ni(OH)_2$ can also serve as an active cathode for a metal-hydride battery. In a Ni/MH battery (FIG. 1), the energy storage metal (M) negative electrode can be electrochemically hydrogenated/dehydrogenated during charge/discharge by the following reaction:

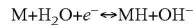

$$M+H_2O+e^- \leftrightarrow MH+OH^-$$

While the following reaction will take place in the Ni positive electrode:

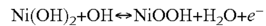

$$Ni(OH)_2+OH \leftrightarrow NiOOH+H_2O+e^-$$

In Mg-based alloys, Mg serves as the main hydrogen storage element (2200 mAh/g for $MgH_2$), and the alloyed metals (Ni, Fe, Mn, Co, Cu, Al, Ti, V, Cr, etc.) in Mg-based alloys functions as the hydriding/dehydriding accelerator and corrosion resistor in the alkaline electrolyte. Even through 30% Ni is added into Mg (such as $Mg_2Ni$), the Mg-based hydrogen storage electrodes still suffer from poor cycling stability due to the continuous corrosion of Mg in the 6 M alkaline electrolyte, which forms a dense $Mg(OH)_2$ layer on the Mg in the alkaline electrolyte and inhibits sustaining reactions. The corrosion of $Mg_2Ni$ is because the formation potential of $Mg_2Ni$ is lower than the hydrogen evolution potential. If the hydrogen evolution potential on Mg-based electrodes could be pushed below the formation potential of the alloy by manipulating salt solvation and concentration, there is a chance to stabilize the Mg-based anode in Ni/MH batteries. This would increase the capacity of NiMH due to the 3 times greater capacity of Mg-based MH than $AB_5$ based MH currently used in Ni/MH batteries, and provide energy density comparable to current Li-ion batteries since the capacity (1001 mAh/g) of $Mg_2Ni$ is almost three times higher than the capacity of graphitic anodes in Li-ion battery, compensating for the loss due to the lower voltage (2.0-2.5 V) of $Ni/MgNi_2H_4$ as compared with LIB.

Shifting $H_2$ evolution potential negatively to reduce the corrosion of Mg in an electrolyte has been demonstrated in an aqueous primary Mg-air battery (see Winther-Jensen, B., et al., *Electrochemica Acta* 53:5881-5884 (2008) and Kong, Y., et al., *Synthetic Metals* 162:584-589 (2012)). Winther-Jensen reported that the hydrogen evolution potentials were shifted to a more negative value by (1) mixing 50% strong solvated LiCl with MgCl; (2) increasing the pH value from 7 to 11; and (3) increasing the concentration of MgCl salt from 1 M to saturation (Winther-Jensen, supra). The negative shift of $H_2$ evolution potential enhanced the discharge capacity and working voltage of Mg-air batteries (Winther-Jensen, supra) due to the retarded corrosion rate of Mg. The suppression of hydrogen evolution on Mg in aqueous electrolyte was also confirmed through visual inspection of an Mg specimen immersed in highly concentrated salt solutions, which did not engender significant gas evolution as usually observed upon immersion of Mg in diluted aqueous solutions (Winther-Jensen, supra). Since Mg-M alloys provide more positive potential than Mg, it is easier to stabilize Mg-M alloy anodes in an aqueous electrolyte by using highly solvated salts and increasing the salt concentration.

The capacity of aqueous Ni/$Mg_2Ni$ batteries (FIG. 1) can be further increased if the cathode and anode can be in situ electrochemically formed by $Mg^{2+}$ insertion/extraction between anode and cathode in aqueous electrolyte employing Mg-ion battery chemistry. For example, $Mg_2Ni$ can be formed by $Mg^{2+}$ insertion into Ni in an aqueous electrolyte providing extra capacity. The enabling of the "hybrid cell chemistries" concept allows the combined capacities of both Mg-ion battery and Ni/MH battery to be accessed, leading to an energy density up to 2 times higher than that of current Li-ion batteries.

As the 5th among the top 40 most abundant elements in the earth's crust, Mg provides long-term sustainability, and is environmentally benign so it can be handled in an uncontrolled ambient atmosphere. Being a bivalent cation, its specific volumetric capacity reaches 3833 mAh/cc, higher than that for Li metal (2046 mAh/cc). State-of-the-art Mg-ion battery technology uses an organic electrolyte with an electrochemical stable window of 2.0-3.0 V (Yoo, H. D., *Energy & Environmental Science* 6:2265-2279 (2013)), just slightly higher than that of a saturated aqueous electrolyte.

Many metals can electrochemically alloy with Mg at different potentials and serve as anodes for a Mg-battery. Arthur and co-workers reported that Bi, Sb, and alloys thereof reversibly reacted with a Mg-ion to form alloys at 0.3 V vs. $Mg/Mg^{2+}$ (x<0.45) alloys which showed a very stable cycle ability in electrochemical alloying/de-alloying with Mg for 100 cycles with 222 mAh/g at the 100th cycle (Arthur, T. S., et al., *Electrochem. Commun.* 16:103-106 (2012)). Tin (Sn) powder electrodes can also react with Mg-ion at 0.2 V vs. $Mg/Mg^{2+}$, delivering 200-300 mAh/g at a slow rate (<0.05 C) (Singh, N., et al., *Chem. Commun.* 49:149-151 (2013)). As shown in FIG. 2, a metal with $Mg^{2+}$ insertion potential above 0.7 V can be safely used as dual chemistry anodes in the aqueous electrolyte at a pH of about 11 when the electrochemical stability window of aqueous electrolyte can be enlarged to 2.5-3.0 V. It is known that increasing the pH value can reduce the Hz evolution potential (FIG. 2), but if the pH is higher than 11, solid Mg(OH) may form on the Mg surface, reducing the reaction kinetics.

In the examples presented, the equilibrium potential of a few metals alloying with Mg-ion were measured and it was identified that Mg-ions can alloy with Ni to form $Mg_2Ni$ at 1.5 V vs. $Mg/Mg^{2+}$ in saturated $MgSO_4$—$Li_2SO_4$ (1:1) aqueous electrolyte, and the formed $Mg_2Ni$ can absorb hydrogen during further charging in the same aqueous electrolyte to form $Mg_2NiH_4$, which validated the "hybrid cell chemistries" concept, in which successive reactions of $Mg^{2+}$ into Ni followed by $H^+$ insertion into the formed $Mg_2Ni$ in saturated aqueous electrolyte occurred.

On the other hand, some metal oxides and sulfides can react with Mg-ion at a high potential, which makes them candidates as Mg-ion battery cathode materials. Typical examples are Chevrel phase MxMo3T4 (M=metal, T=S, Se) (Levi, E., et al., *Journal of Electroceramics* 22:13 (2009)), vanadium oxides (Imamura, D., et al., *J. Electrochemical Society* 150:A753 (2003) and Novak, P., et al., *Electrochimica Acta* 45:351 (1999)), $TiS_2$ nanotubes (Tao, Z., et al., *Chem. Commun.* 2080 (2004)), mesoporous $Mg_{1.03}Mn_{0.97}SiO_4$ and graphite-like $MoS_2$ (Liang, Y., et al., *Advanced Materials* 23:640 (2011)), $Co_3O_4$ (Sutto, T. E., *Electrochimica Acta* 80:413-417 (2012)), and $MnO_2$ (Rasul, S., et al., *Electrochimica Acta* 82:243-249 (2012); Zhang, R., et al., *Electrochemistry Commun.* 23:110-113 (2012); and Rasul, S. et al., *Solid State Ionics* 225:542-546 (2012)). Among these, only $MnO_2$ can react with both Mg-ion and H-ion at potentials where aqueous electrolyte remains stable.

Mg-ion can insert into $MnO_2$ according to the following formula:

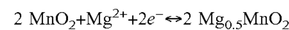

$$2\ MnO_2+Mg^{2+}+2e^- \leftrightarrow 2\ Mg_{0.5}MnO_2$$

providing a capacity of 200-470 mAh/g ($Mg_xMnO_2$; x=0.4-0.8) in organic electrolyte in potential ranges of 2.0-3.3 V vs. $Mg/Mg^{2+}$, which is within the stability window of aqueous electrolytes as shown in FIG. 2.

$MnO_2$ has also been used in aqueous battery cathodes to reversibly store protons at a potential slightly below the Mg-ion insertion potential (Chen, L., *Chem. Commun.* 49:2204-2206 (2013)) as shown by the following formulas:

$$MnO_2+H^++e^- \leftrightarrow MnOOH\ \text{(for pH<7)}$$

$$MnO_2+H_2O+e^- \leftrightarrow MnOOH+OH^-\text{(for pH>7)}$$

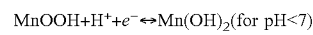

$$MnOOH+H^++e^- \leftrightarrow Mn(OH)_2\text{(for pH<7)}$$

$$MnOOH+H_2O+e^- \leftrightarrow Mn(OH)_2+OH^-\text{(for pH>7)}$$

Thus, a $Mg_{0.5}MnOOH$ cathode could couple with a Ni anode and organic electrolyte to form a full cell. If the organic electrolyte is used as in a conventional Mg battery, only $Mg^{2+}$ transports between the $Mg_{0.5}MnOOH$ cathode and the Ni anode (FIG. 3). During charge, $Mg^{2+}$ transports between the $Mg_{0.5}MnOOH$ cathode to alloy with Ni at anode to form $Mg_2Ni$, and then upon discharge $Mg^{2+}$ moves back from $Mg_2Ni$ to $Mg_{0.5}MnOOH$, delivering the "Mg-ion battery" capacity (FIG. 3). However, according to the present invention, if saturated and "water-in-salt" aqueous electrolytes are used, both $Mg^{2+}$ and $H^+$ will successively transport between the $Mg_{0.5}MnOOH$ cathode and the Ni anode (FIG. 4), delivering the capacity of "hybrid cell chemistries."

For a hybrid cell, during charge, $Mg^{2+}$ and then $H^+$ extracted from the $Mg_{0.5}MnOOH$ cathode transport through the aqueous electrolyte and then successively insert into the Ni anode to first form $Mg_2Ni$ and then $Mg_2NiH_4$, while the $Mg_{0.5}MnOOH$ cathode changes to MnOOH and then to $MnO_2$. During discharge, a reversal reaction takes place (FIG. 4).

Despite the numerous advantages of aqueous Li-ion chemistry—including superior safety, low environmental impact, and low cost—the narrow electrochemical stability window of the water molecule (<1.5 V) imposes an intrinsic limit on the practical energy output from use of such a chemistry.

Since the advent of a commercial, non-aqueous, Li-ion battery ($LiCoO_2$/organic electrolyte/graphite) by Sony Company in 1991, Li-ion batteries gradually dominated the electrochemical storage market for several years relying on their distinct advantages of higher real energy density and longer cycling life (Armand, M. and Tarascon, J. M., *Nature* 451:652-657 (2008) and Whittingham, M. S., *Chemical Reviews* 104:4271-4301 (2004)).

In contrast to aqueous rechargeable batteries (Ni-MH and Pb-acid), non-aqueous Li-ion batteries are undesirable based upon safety considerations and their cost due to the inflammable organic electrolyte and the manufacturing process requiring strict moistureless conditions (Tarascon, J. M. and Armand, M., *Nature* 414:359-367 (2001); Goodenough, J. B.; Kim, Y., *Chemistry of Materials* 22:587-603 (2010); and Xu, K., *Chemical Reviews* 104:4303-4417 (2004)).

Accounting for safety and cost-effective rations, aqueous Li-ion batteries were invented in 1993 (Li, W., et al., *Science*

264:1115-1118 (1994)). Unfortunately, progress in Li-ion battery chemistry has been very slow, even at a standstill at times, due to the bottleneck of aqueous electrolyte which presents the following problems: (1) the narrow stable thermodynamic and dynamic electrochemical window limits the output voltage of a full cell to less than 1.5 V (Wang, Y. G., et al., *Advanced Energy Materials* 2(7):830-840 (2012)); (2) the high hydrogen evolution potential restricts the choice of anode to a large extent and $H_2$ evolution in the full charge makes the stability of the anode deteriorate rapidly owing to self-discharge caused by side reaction between electrode and water (Li, W., et al., *J. Electrochemical Society* 141(9):2310-2316 (1994)); (3) the inevitable dissolving of oxygen in the aqueous electrolyte accelerates electrode fading (Luo, J.-Y., et al., *Nature Chemistry* 2(9):760-765 (2010)); and (4) the aqueous electrolyte decomposition cannot form a protective solid electrolyte interphase (SEI) on the electrode like an organic electrolyte. All of the reasons mentioned above cause the relatively low real energy density (low output voltage), short cycling life (self-discharge), and low coulombic efficiency (water decomposition) in rechargeable aqueous lithium ion batteries.

To solve the problems inherent to Li-ion batteries, the most common approach is to reduce hydrogen evolution potential by adjusting the alkalinity of the electrolyte based on pourbaix diagrams (see Li, supra and Luo, supra), however, at the same time, the choice of cathode is also limited due to oxygen evolution potential which will also decrease in strong alkaline electrolyte. The other way is to increase overpotential of water decomposition by coating carbon/polymer on the electrode (Tang, W., et al., *Energy & Environmental Science* 5:6909-6913 (2012); Aravindan, V., et al., *Physical Chemistry Chemical Physics* 14(16):5808-5814 (2012); and Luo, J. Y., et al., *Advanced Functional Materials* 17(18):3877-3884 (2007)), but this dynamic improvement seems to just delay the electrode fading. Because, in the cycling process, the capacity retention is mainly determined by test time, the range of setting up test voltage and coulombic efficiency is sensitive to charge-discharge rate. All those phenomena reveal that aqueous electrolyte decomposition always exists in the whole charge-discharge process. Although a high voltage is desirable for achieving high energy density of a LIB, the practical output voltage and stability of electrode are at present limited by the stable electrochemical window of aqueous electrolyte. Thus, if we want to achieve high voltage and long cycling life, the research and development of stable aqueous electrolyte is generally considered to be fundamental.

There is tremendous room in improving the energy density of aqueous battery to levels comparable or even higher than those of Li-ion batteries, either by enlarging the electrochemical stability window of aqueous electrolytes or by increasing the electrode capacities.

The present invention provides an aqueous electrolyte entitled "water-in-LiTFSI" with a wide and stable electrochemical window (2.7 V) due to the formation of a full Li-ion-$H_2O$ complex with strong solvation energy and stable protective SEI layer on the anode in the first discharge. In this system, the hydrogen evaluation potential can extend to −1.3 V vs. Ag/AgCl reference in neutral solution. Full cell ($LiMn_2O_4$/water-in-Salt/$Mo_3S_4$) presents ultrahigh output voltage (>2.0 V), super-long stable cycling life both in low rate (0.15 C) and high rate (4.5 C), and nearly 100% coulombic efficiency with an energy density which could be achieved of 100 Wh/kg based on the total mass of cathode and anode.

BRIEF SUMMARY OF THE INVENTION

In some embodiments, the present invention provides an electrochemical cell comprising:

(a) an anode;

(b) a cathode; and (c) a water-in-salt electrolyte.

In some embodiments, the cathode comprises $Mg_{0.05}AOOH$, wherein A is a metal or an alloy of a metal. In some embodiments, A is a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au or is an alloy of a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au. In some embodiments, A is Mn, Co, Ni, or Fe.

In some embodiments, the anode comprises $Mg_2M$, wherein M is a metal or an alloy of a metal. In some embodiments, M is selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au or is an alloy of a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au. In some embodiments, M is Fe, Ni, Mn, Co, Al, Zn, Sn, Bi, Zr, or Cu or is an alloy of a metal selected from the group consisting of Fe, Ni, Mn, Co, Al, Zn, Sn, Bi, Zr, or Cu. In some embodiments, M is Ni.

In some embodiments, the salt in the water-in-salt electrolyte is a sulfone-based salt.

In some embodiments, the salt in the water-in salt electrolyte is selected from the group consisting of $LiN(SO_2CF_3)_2$, $LiN(SO_2CH_3)_2$, $LiN(SO_2C_4H_9)_2$, $LiN(SO_2C_2F_5)_2$, $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$, and $LiN(SO_2F)(SO_2CF_3)$.

In some embodiments, the salt in the water-in-salt electrolyte is $LiN(SO_2CF_3)_2$.

In some embodiments, the amount of water in the water-in-salt electrolyte is between 20% and 100% (by volume). In some embodiments, the amount of water in the water-in-salt electrolyte is between 30% and 100% (by volume). In some embodiments, the amount of water in the water-in-salt electrolyte is between 40% and 100% (by volume).

In some embodiments, the water-in-salt electrolyte has a pH between 7 and 11.

In some embodiments, the cell has an operating temperature between −40° C. and 100° C. In some embodiments, the cell has an operating temperature between −40° C. and 70° C.

In some embodiments, the cell has a full cell voltage output between 1.5 V and 4.0 V.

In some embodiments, the cell has a full cell voltage output between 1.8 V and 4.0 V.

In some embodiments, the present invention provides an electrochemical cell comprising:

(a) an anode;

(b) a cathode comprising $Mg_{0.05}AOOH$, wherein A is a metal or an alloy of a metal; and (c) an aqueous electrolyte.

In some embodiments, A is a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au or is an alloy of a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au. In some embodiments, A is Mn, Co, Ni, or Fe.

In some embodiments, the aqueous electrolyte is a water-in-salt electrolyte.

In some embodiments, the salt in the aqueous electrolyte is a sulfone-based salt.

In some embodiments, the salt in the aqueous electrolyte is selected from the group consisting of $LiN(SO_2CF_3)_2$, $LiN(SO_2CH_3)_2$, $LiN(SO_2C_4H_9)_2$, $LiN(SO_2C_2F_5)_2$, $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$, and $LiN(SO_2F)(SO_2CF_3)$.

In some embodiments, the salt in the aqueous electrolyte is $LiN(SO_2CF_3)_2$.

In some embodiments, the amount of water in the aqueous electrolyte is between 20% and 100% (by volume). In some embodiments, the amount of water in the aqueous electrolyte is between 30% and 100% (by volume). In some embodiments, the amount of water in the aqueous electrolyte is between 40% and 100% (by volume).

In some embodiments, the aqueous electrolyte has a pH between 7 and 11.

In some embodiments, the present invention provides an electrochemical cell comprising:

(a) an anode comprising $Mg_2M$, wherein M is a metal or an alloy of a metal;

(b) a cathode comprising $Mg_{0.05}AOOH$, wherein A is metal or an alloy of a metal; and (c) an water-in-salt electrolyte.

DETAILED DESCRIPTION OF THE INVENTION

As used herein, the singular terms "a" and "the" are synonymous and used interchangeably with "one or more" and "at least one," unless the language and/or context clearly indicates otherwise.

All numbers in this description indicating amounts, ratios of material, physical properties of materials and/or use are to be understood as modified by the word "about," except otherwise explicitly indicated.

The term "about" is used herein to mean the given number plus or minus 1 to 10%.

As used herein, the term "cathode" refers to the electrode where electrochemical reduction occurs during the discharging process.

As used herein, the term "anode" refers to the electrode where electrochemical oxidation occurs during the discharging process.

As used herein, the term "nano" means that the particle size is less than 100 nm.

The $Mg^{2+}/H^+$ hybrid chemistry of the present invention comprises: a nano-M anode (wherein M is a metal or a metal alloy), an aqueous electrolyte based on a salt-saturated electrolyte or a "water-in-salt" electrolyte, and a metal cathode based on $Mg_{0.5}AOOH$ (wherein A is a metal, a metal alloy, or a metal intercalation material).

Figure 4:
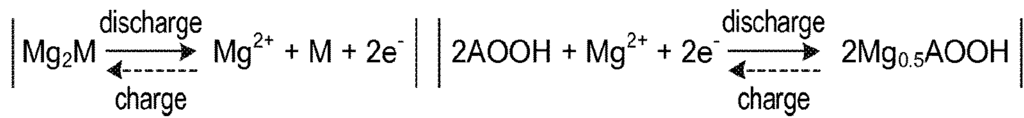
FIG. 4 is a schematic illustrating the electrochemical reaction process of a $Mg^{2+}/H^+$ battery in a water-in-salt electrolyte. During charge, Mg ions in the $Mg_{0.5}AOOH$ positive electrode travel from the electrolyte to the metal M (or alloy) negative electrode and form an AOOH positive electrode and $Mg_2M$ negative electrode. Upon further charging, $H^+$ in AOOH moves through the aqueous electrolyte into $Mg_2M$ to form $Mg_2NiH_4$, releasing additional capacity. During discharge, a reverse reaction takes place.
Figure 4:
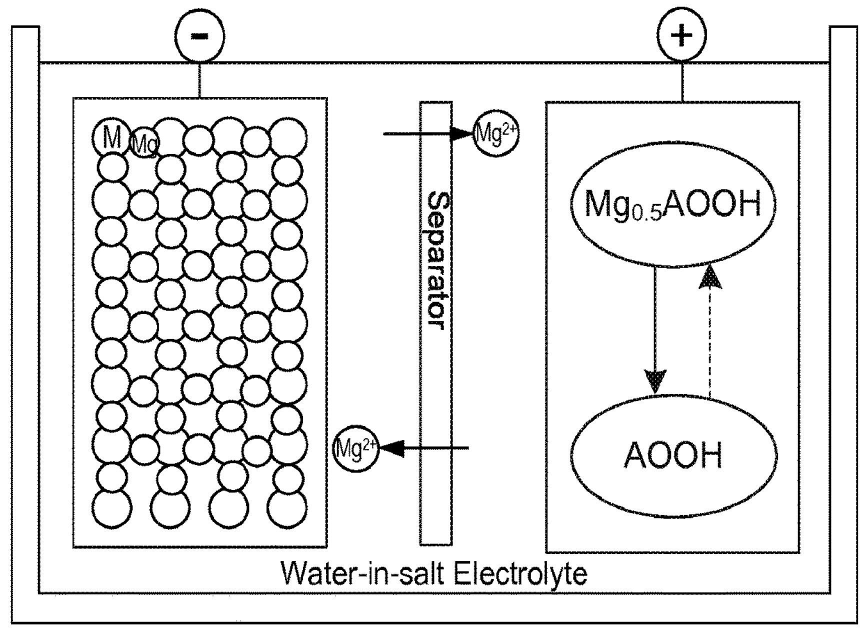
Figure 4:
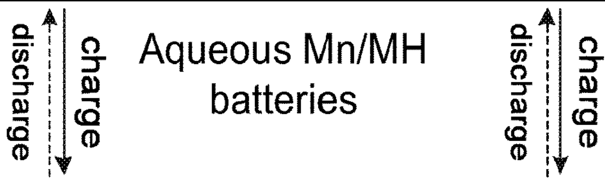
Figure 4:
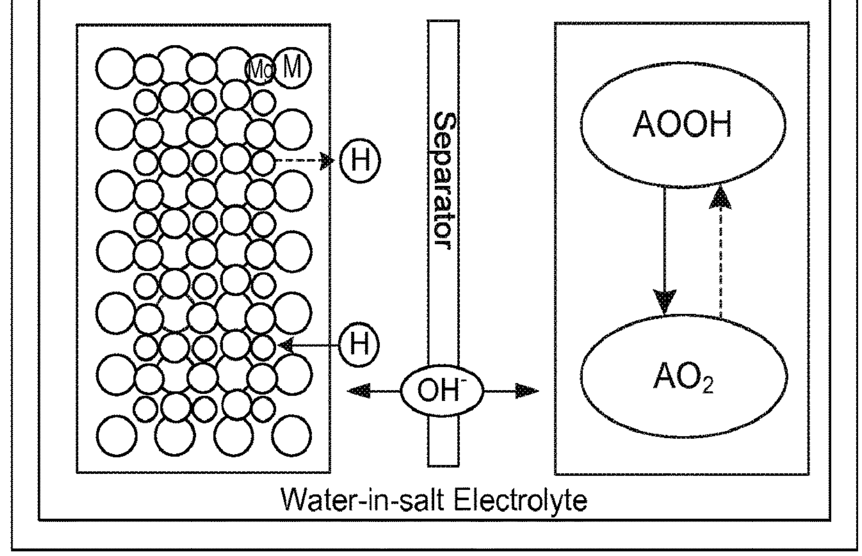
Figure 4:
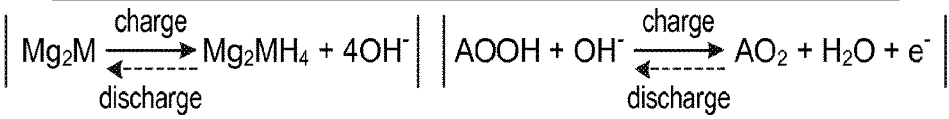
Figure 5:
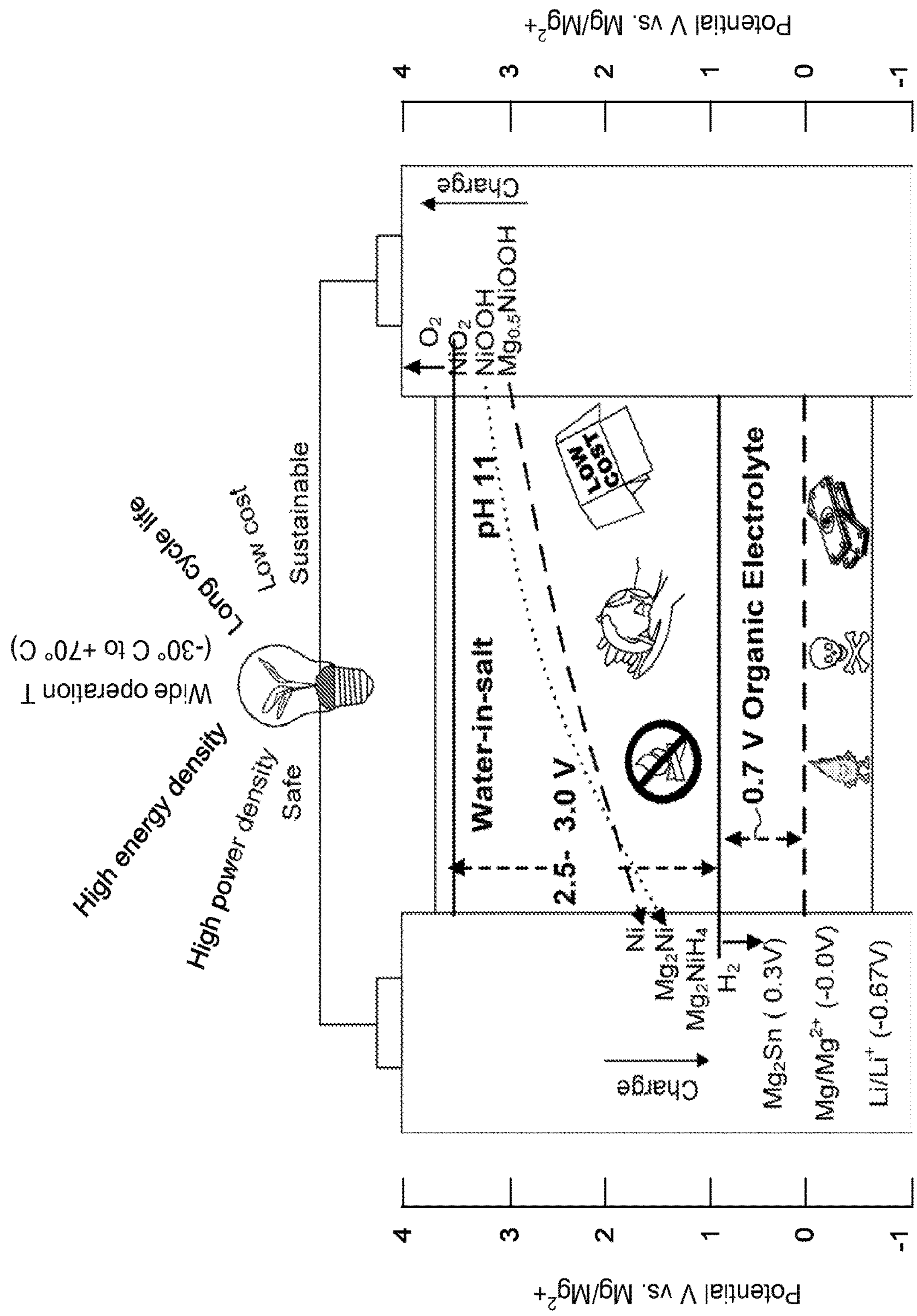
FIG. 5 is a schematic presenting the advantages of hybrid batteries. Electrode potentials and stable electrochemical window of saturated (or water-in-salt) electrolyte and organic electrolyte are compared.
Figure 6:
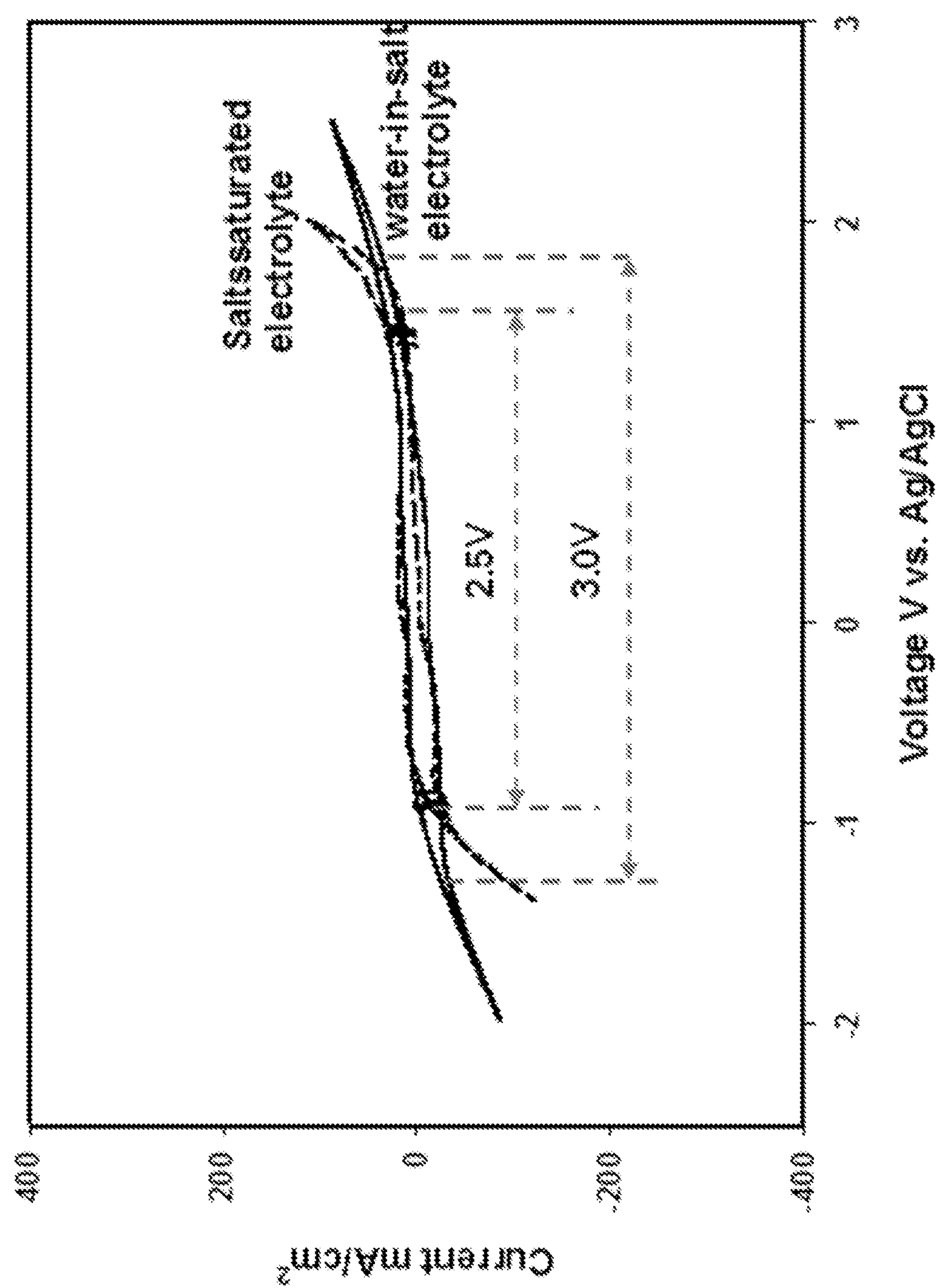
FIG. 6 is a graph depicting the electrochemical stability windows of a saturated $Li_2SO_4$—$MgSO_4$ (1:1) electrolyte and a water-in-salt ($Li_2SO_4$—$MgSO_4$ (1:1)) electrolyte measured using cycle voltammetry at a scan rate of 10 mV/s.

As shown in FIG. 4, during charge, initially $Mg^{2+}$ ions move from the $Mg_{0.5}AOOH$ positive electrode through the aqueous electrolyte to form an intermetallic alloy with the nano-M (the particle size is less than 100 nanometers) negative electrode, since these nano-M anodes can only electrochemically alloy with Mg but not with H. The formation of $Mg_2M$ from M generates a high capacity (1816 mAh/g for Ni), while the $Mg_{0.5}AOOH$ positive electrode will change to AOOH (capacity: 268 mAh/g for $Mg_{0.5}AOOH$). Due to the extra-low water activity of saturated electrolyte and "water-in-Mg-salt" electrolytes, Mg corrosion in $Mg_2M$ will be effectively suppressed during this stage of insertion by $Mg^{2+}$. The formed $Mg_2M$, a known hydrogen storage material and previously used as an alkaline Ni/MH battery negative electrode, will act as a host for the next stage of chemistry, i.e., absorption of $H^+$, with an additional capacity (1001 mAh/g for $Mg_2Ni$ to form $Mg_2NiH_4$). In this process, the AOOH will further oxidize into $AO_2$ giving additional capacity (308 mAh/g for $MnO_2$). The total theoretical capacities of the Ni anode and the $Mg_{0.5}AOOH$ cathode are 2817 mAh/g and 576 mAh/g, respectively. Thus, with optimum anode/cathode matching this hybridized cell chemistry combining $Mg^+$-insertion/$H^+$-absorption can potentially provide 478 mAh/g on the full-cell level in the voltage range of 2.5 V, which is equivalent to an energy density of −1195 Wh/kg, higher than the theoretical capacity (390 Wh/kg) of $C/LiCoO_2$ battery by more than three times.

During discharge, a reverse reaction will take place (FIG. 4) due to the good reversibility. Thus, hybrid $Mg^{2+}/H^+$ aqueous chemistry is instrically hybridized on a materials level.

Figure 2:
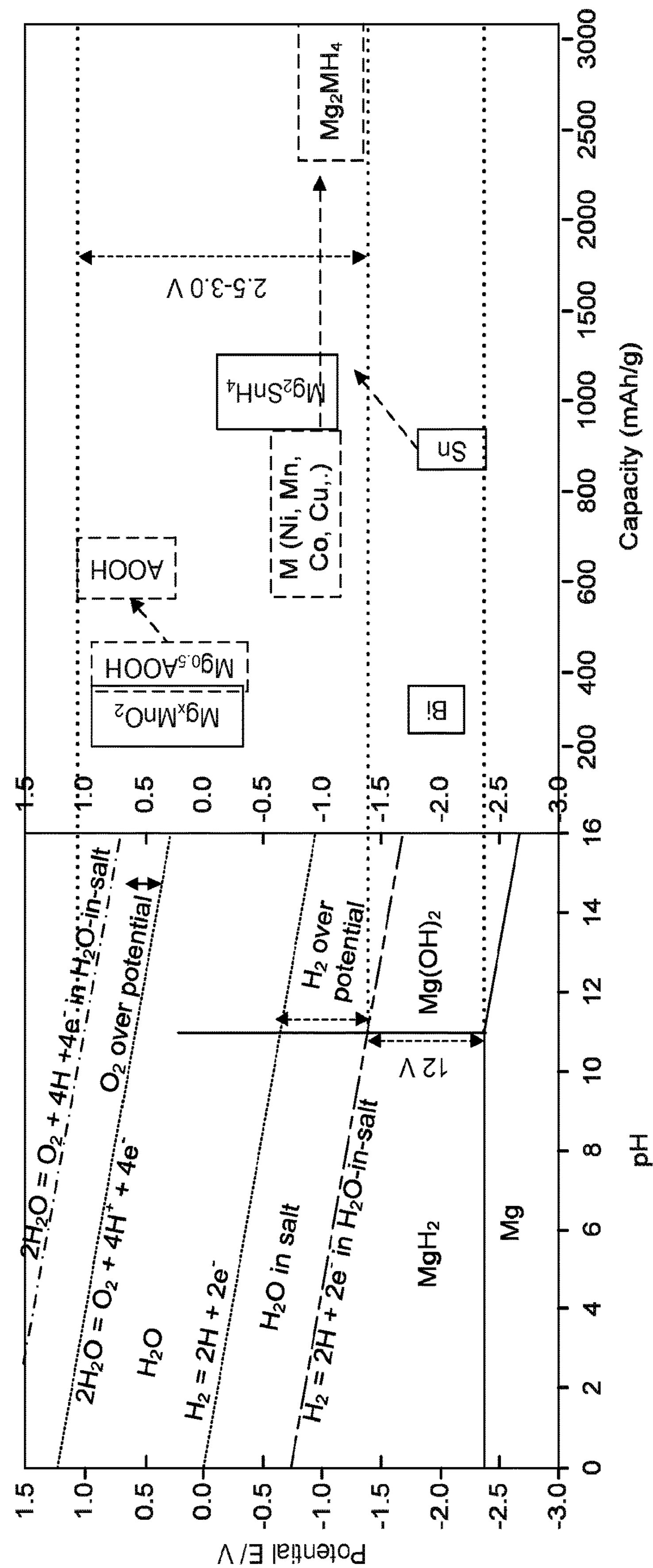
FIG. 2 is a scheme illustrating the evolution potential and on the left side is the $O_2/H_2$ evolution potential versus normal hydrogen electrode (NHE) at different pHs for water and water-in-salt solutions. On the right side are the insertion potential for $Mg^{2+}$ alloying into metals (M) to form $Mg_2M$ and successive proton insertion potential of $Mg_2M$ to form $Mg_2MH_4$ negative electrode, the potentials of $Mg^{2+}$ extracting from $Mg_xA(OH)_2$, wherein A is Mn, Ni, Co, Fe, and their alloys, to form $A(OH)_2$ positive electrode and successive proton extraction from $A(OH)_2$ to AOOH positive electrodes. The solid squares in the scheme represent electrode values reported in the literature and the dashed squares represent proposed electrode values.

Innovative aspects of the hybrid $Mg^{2+}/H^+$ aqueous chemistry:

(1) Use of a salt saturated liquid electrolyte and "water-in-salt" solid electrolyte can effectively reduce the water activity, thus (a) increasing the cell energy density by enlarging the cell voltage (see FIG. 2); (b) improving the cycling life of batteries by preventing the corrosion of $Mg_2M$ anodes in aqueous electrolyte; (c) protecting the cell from overcharge/discharge through water decomposition and recombination, as Ni/MH battery, and improve the safety; and (d) operating at a low temperature of −30° C. due to freezing temperature of saturated electrolyte (Yin, supra). Although the ionic conductivity of salt in "water-in-salt ($LiSO_4$—$MgSO_4$)" will be reduced from its maximum value to 0.1 S/cm due to the high concentration used, it is still more than 10 times higher than the typical ion conductivities (10 mS/cm) of organic electrolyte currently used in Li-ion batteries.

(2) Integration of aqueous $Mg_2$ into a Mn/MH battery on a materials level, thus (a) increasing the capacity of the Mn/MH cell by more than 3 times; and (b) preventing the oxidation of $Mg_2MH_4$ anodes by $O_2$ through a combination of hydrogen in $Mg_2MH_4$ improving cycling stability of batteries. In the presence of $O_2$ in an aqueous electrolyte cell, all negative electrode materials (except the MH electrode) would theoretically be subject to chemical oxidation by $O_2$ rather than undergo the electrochemical redox process (Wang, Y., et al., *Adv. Energy Mater.* 2:830-840 (2012)).

The serious intrinsic problem of an aqueous ion ($Mg^{2+}$, $Li^+$, $Na^+$) battery using active metal anodes is that these metals tend to be chemically oxidized by the $O_2$ that is generated at the cathode during charge (if cathode capacity is lower than anode capacity) or overcharge. This parasitic reaction will quickly reduce the utilizable capacity of anodes (Luo, J. Y., et al., *Nat. Chem.* 2:760 (2010)). However, in $Mg^{2+}/H^+$ hybrid batteries, the absorbed H will be first oxidized rather than Mg in $Mg_2MH_4$ forming water, thus protecting Mg from corrosion. The electronic controlling circuit for preventing the overcharge used in organic electrolyte will thus be eliminated due to this shuttle protection mechanism.

Figure 1:
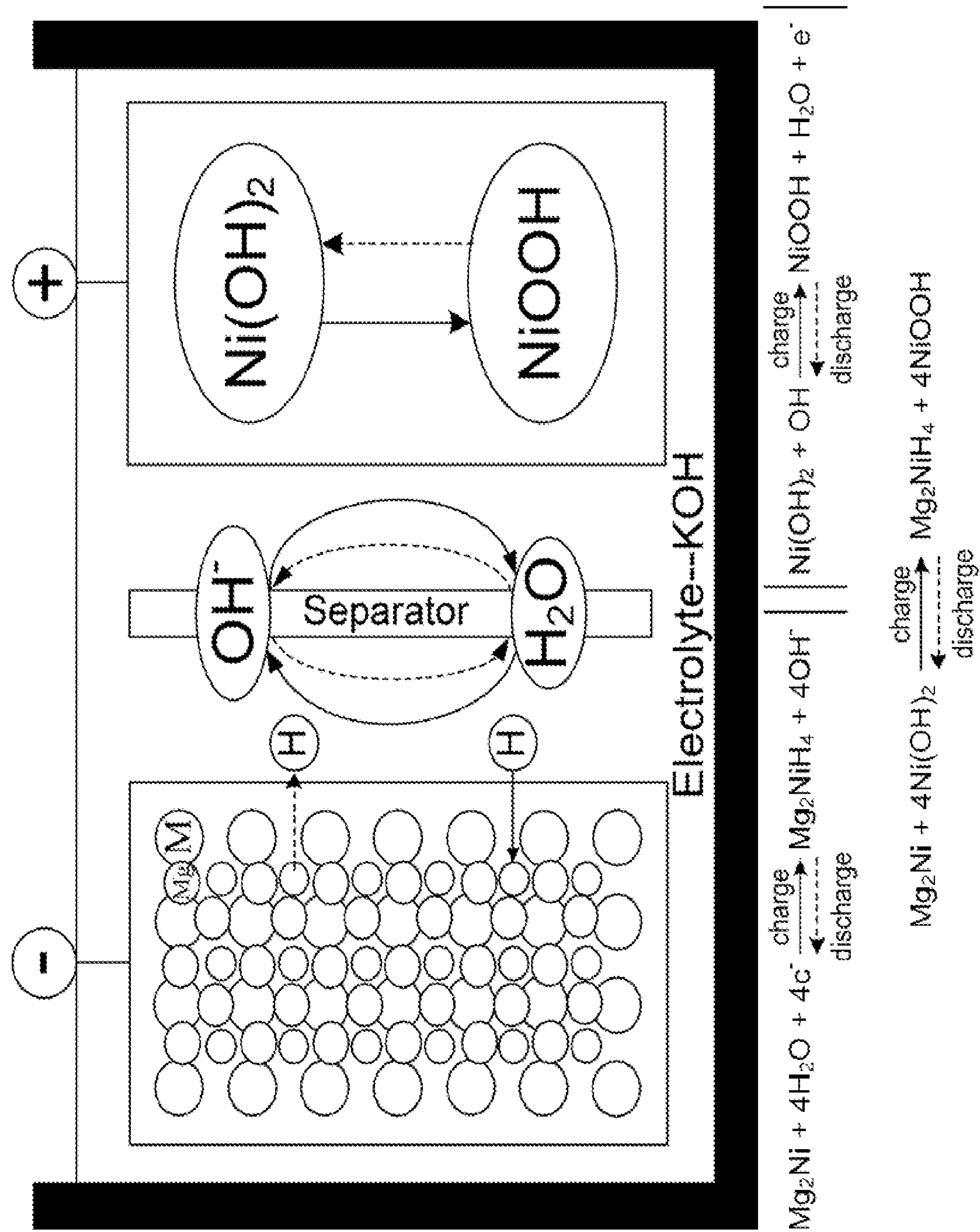
FIG. 1 is a scheme illustrating the electrochemical reaction process of a $Ni/Mg_2NiH_4$ battery in an alkaline electrolyte. During charge, the protons move from the $Ni(OH)_2$ through the aqueous electrolyte to the $Mg_2Ni$ alloy to form $Mg_2NiH_4$. Upon discharge, the protons move away from the $Mg_2NiH_4$ alloy through the aqueous electrolyte to the NiOOH to form $Ni(OH)_2$.
Figure 3:
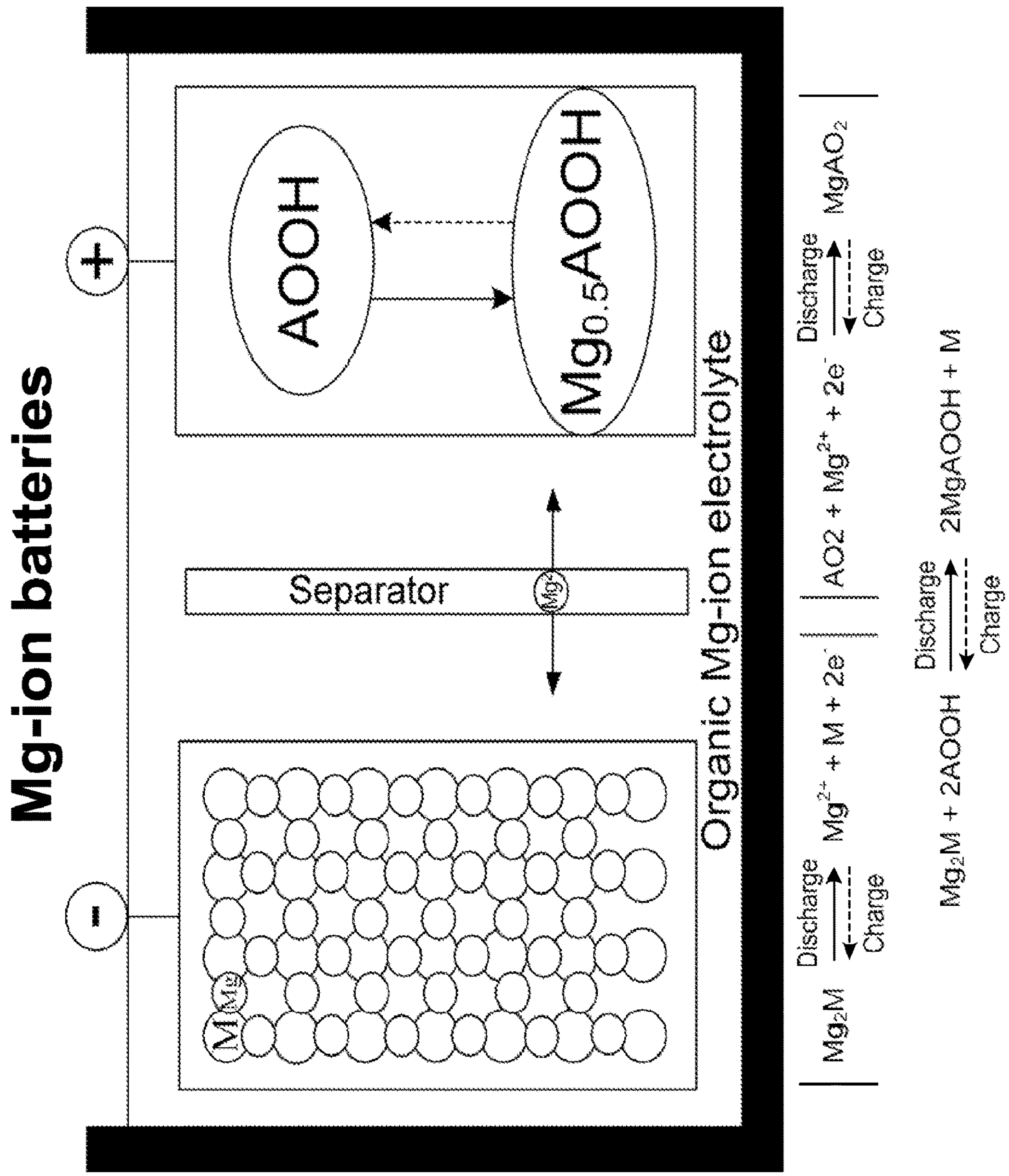
FIG. 3 is a schematic illustrating the electrochemical reaction process of a Mg-ion battery in organic electrolyte.

Therefore, the aqueous electrolyte battery (FIG. 4) hybridizes two distinct battery chemistries into an aqueous hybrid $Mg^{2+}/H^+$ battery system on a materials level, combining the high capacities of $Ni/Mg_2NiH_4$ (FIG. 1) and Mg-ion rechargeable chemistries (FIG. 3) while circumventing the disadvantages of both.

(3) The aqueous hybrid Mg-ion/H-ion battery will have (a) 2 times the energy density of current Li-ion batteries; (2) have more than 1000 cycle life at 80% depth of discharge (DOD); (3) be much cheaper due to aqueous electrolyte, abundant Mg metals used, and absence of battery management system; (4) have power density comparable to Li-ion batteries; (5) be intrinsically safe; and (6) operate in wide range of temperatures from −30° C. to +70° C. These performances cannot be reached by any existing battery chemistries, representing a fundamental advancement relative to the state of the art in the EV battery technologies.

In one embodiment, the disclosure provides an electrochemical cell comprising:

(a) an anode;

(b) a cathode comprising $Mg_{0.05}AOOH$, wherein A is a metal or an alloy of a metal; and (c) an aqueous electrolyte.

In some embodiments, the electrochemical cell is a battery cell. In some embodiments, the electrochemical cell is a secondary battery cell.

The Anode

Since the roles of M in $Mg_xM$ are reaction accelerator and corrosion resistor for hydriding/dehydriding, and a stabilizer for Mg-ion insertion/extraction in aqueous electrolyte, any metals and alloys that can electrochemically react with Mg-ion at a potential between 0.8-1.3V can be selected for $H^+$ insertion/extraction in saturated liquid electrolyte or water-in-salt solid electrolyte.

In some embodiments, anode materials are selected that have theoretical potential between 0.8-1.3 V vs. Mg and high capacity. The anode materials can be designed in nano-size to accelerate the kinetics for Mg-ion insertion/extraction. The Mg-ion insertion/extraction potential of anode materials can be compared and their capacity measured in organic electrolyte and evaluated against theoretical values. The diffusion coefficient of Mg-ion in nano-M can be determined using phase transformation, a galvanostatic intermittent titration technique (GITT), a potentiostatic intermittent titration technique (PITT), and/or constant voltage (CV) measurements (see Zhu, Y., et al., *J. Phys. Chem. C* 115:823-832 (2011) and Zhu, Y., *J. Phys. Chem. C* 114:2830-2841 (2010)). One of ordinary skill in the art can select nano-M anodes based on cycling stability tests. And, one of ordinary skill in the art can determine the structure and morphology of anode materials using scanning electrode microscopy (SEM), transmission electrode microscopy (TEM), and/or x-ray diffraction spectroscopy (XRD).

In some embodiments, the anode material is a nano-M (wherein M is a metal or a metal alloy). In some embodiments, M is selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au. In some embodiments, M is an alloy of a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au.

In some embodiments, the anode material is $Mg_2M$ (wherein M is a metal or a metal alloy). In some embodiments, M is selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au. In some embodiments, M is an alloy of a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au. In some embodiments, the anode material is $Mg_2Ni$.

In some embodiments, the anode material is $Mo_3S_4$.

Anode materials can be screened using an organic Mg-ion conductive electrolyte. In some embodiments, the conductive electrolyte is a boron-based Mg-ion conductive electrolyte with an electrochemical window of >3.5 V (see Guo, Y.-S., et al., *Energy Environ. Sci.* 5:9100-9106 (2012)).

A boron-based Mg-ion conductive electrolyte consists of the reaction products between tri(3,5-dimethylphenyl)borane and PhMgCl in THF. The electrolyte shows a very high magnesium reversibility and deposition/dissolution efficiency of almost 100%. The wide electrochemical window from 0.0-3.5 V can accurately measure the potential and capacity of a cathode without the influence of side reactions.

The Cathode

The cathode materials can be synthesized using hydrothermal and electrochemical methods known to those of skill in the art. The electrochemical performance of the cathode materials during Mg-ion insertion/extraction in organic electrolyte and electrochemical performance of Mg-ion extracted AOOH during proton insertion/extraction in Mg-free saturated aqueous electrolyte and water-in-salt electrolyte can be tested using techniques known to those in the art. And, the performance of cathode materials during hybrid $Mg^{2+}$ can be analyzed using techniques known to those in the art.

A boron-based Mg-ion conductive electrolyte consists of the reaction products between tri(3,5-dimethylphenyl)borane and PhMgCl in THF. The electrolyte shows a very high magnesium reversibility and deposition/dissolution efficiency of almost 100%. The wide electrochemical window from 0.0-3.5 V can accurately measure the potential and capacity of a cathode without the influence of side reactions.

Some metal oxides and sulfides react with the Mg-ion at a high potential. In some embodiments, the cathode is a Mg-ion battery cathode material. In some embodiments, the Mg-ion battery cathode material is a Chevrel phase MxMo3T4 (M=metal, T=S or Se), a vanadium oxide, a $TiS_2$ nanotube, mesoporous $Mg_{1.03}Mn_{0.97}SiO_4$, or a graphite-like $MoS_2$.

In some embodiments, the cathode material is $Mg_{0.5}AOOH$ (wherein A is a metal or a metal alloy). In some embodiments, A is a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au. In some embodiments, A is an alloy of a metal selected from the group consisting of Li, Mg, Mn, Co, Ti, Zn, Al, Zn, Cr, Fe, Ni, Sn, Pb, H, Cu, Ag, Pd, Hg, Pt, Bi, Zr, and Au. In some embodiments, the cathode material is $Mg_{0.5}MnOOH$. In some embodiments, the cathode material is $Mg_{0.5}CoOOH$, $Mg_{0.5}NiOOH$, or $Mg_{0.5}FeOOH$.

In some embodiments, the cathode material is $LiMn_2O_4$.

Cathode materials can be screened using an organic Mg-ion conductive electrolyte. In some embodiments, the conductive electrolyte is a boron-based Mg-ion conductive electrolyte with an electrochemical window of >3.5 V (see Guo, supra).

In some embodiments, the cathode materials are synthesized using hydrothermal and electrochemical methods that are known to those skilled in the art. For example, MnOOH can be synthesized using a one-step hydrothermal method (He, L., et al., *Journal of Power Sources* 220:e228-e235 (2012)). $Mg_{0.5}MnOOH$ can be synthesized using a electrochemical method (Mg-ion insertion) or using a hydrothermal method (adding $MgSO_4$ in a precursor).

High Voltage Aqueous Electrolyte

The theoretical energy density of the hybridized $Mg^{2+}/H^+$ chemistry in aqueous electrolytes is about 2 times higher than the theoretical energy density of non-aqueous $LiCoO_2$/graphite Li-ion batteries. Although the high concentration of salt in the water-in-salt reduces the ionic conductivity (about 0.1 S/cm (see FIG. 7)), it is still about 10-20 times higher than that of an organic electrolyte (about 5-10 mS/cm). Therefore, the hybrid cell should also support power density comparable to that of Li-ion batteries. Moreover, the use of a water-in-salt electrolyte can mitigate the corrosion of magnesium alloys, a major reason for capacity decline of Mg-based metal hydride anodes in Ni/MH batteries and thus enhance the cycling life of the hybrid cells. Furthermore, the chemical oxidation of Mg in $Mg_2M$ anodes in the presence of $O_2$ will be prevented in the hybridized $Mg^{2+}/H^+$ chemistry by oxidation of the proton in $Mg_2MH_4$ to form water and further improve cycling life.

The thermal runway hazard can be essentially eliminated with the use of an aqueous electrolyte. The shuttle reaction through water electrolysis and recombination protects the hybridized $Mg^{2+}/H^+$ ion cell from overcharge and discharge, further improving the safety. The aqueous electrolyte is also much cheaper than non-aqueous electrolytes not only due to the abundance of Mg but also due to the absence of organic solvents. Furthermore, the use of Mg-based anodes (i.e., $Mg_2Ni$: 1001 mAh/g) to replace $LaNi_5H_6$ (371 mAh/g) alloys enhances the cell capacity and reduces the cost per energy density.

Figure 7:
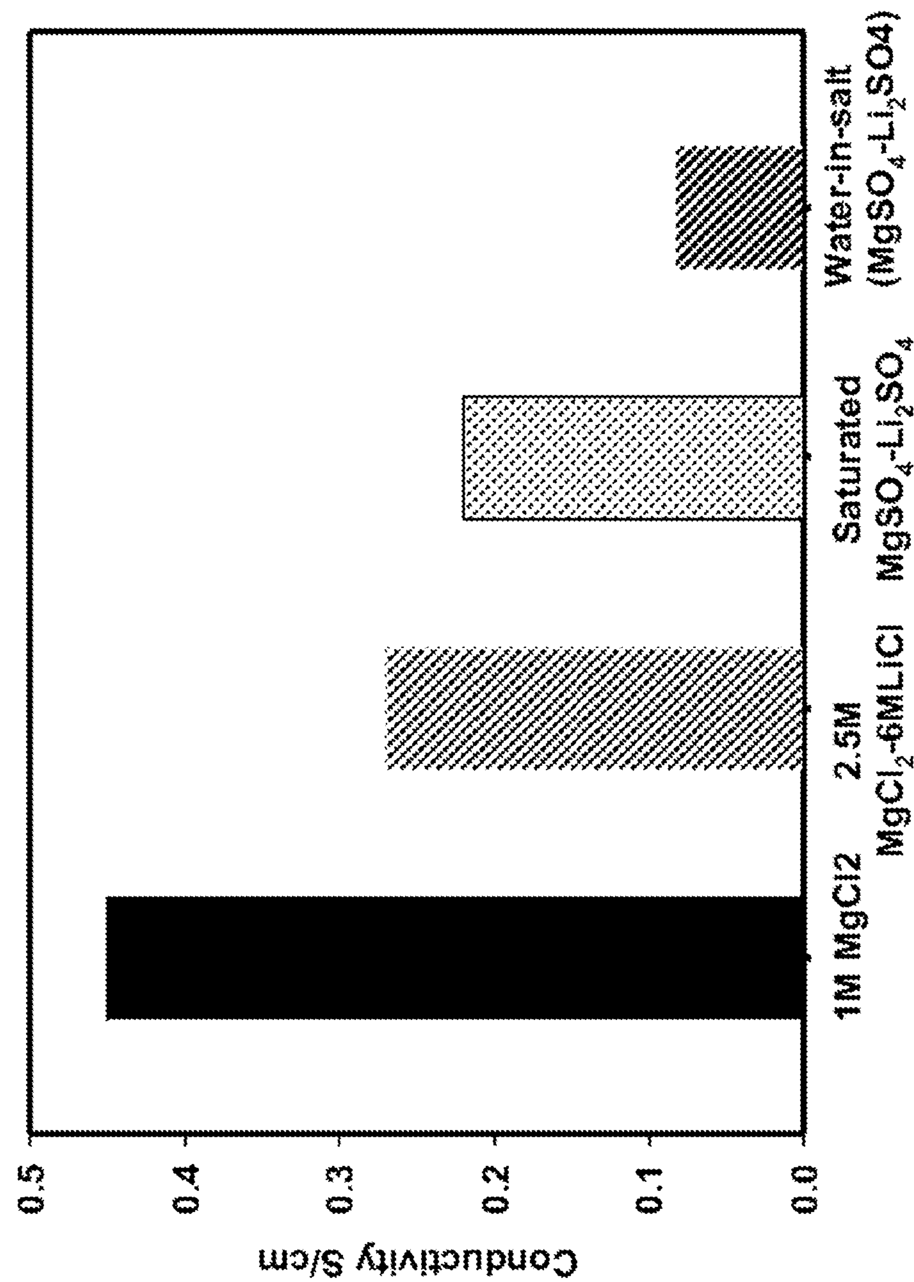
FIG. 7 is bar graph showing the ionic conductivity of different electrolyte measured using electrochemical impedance spectroscopy.
Figure 8:
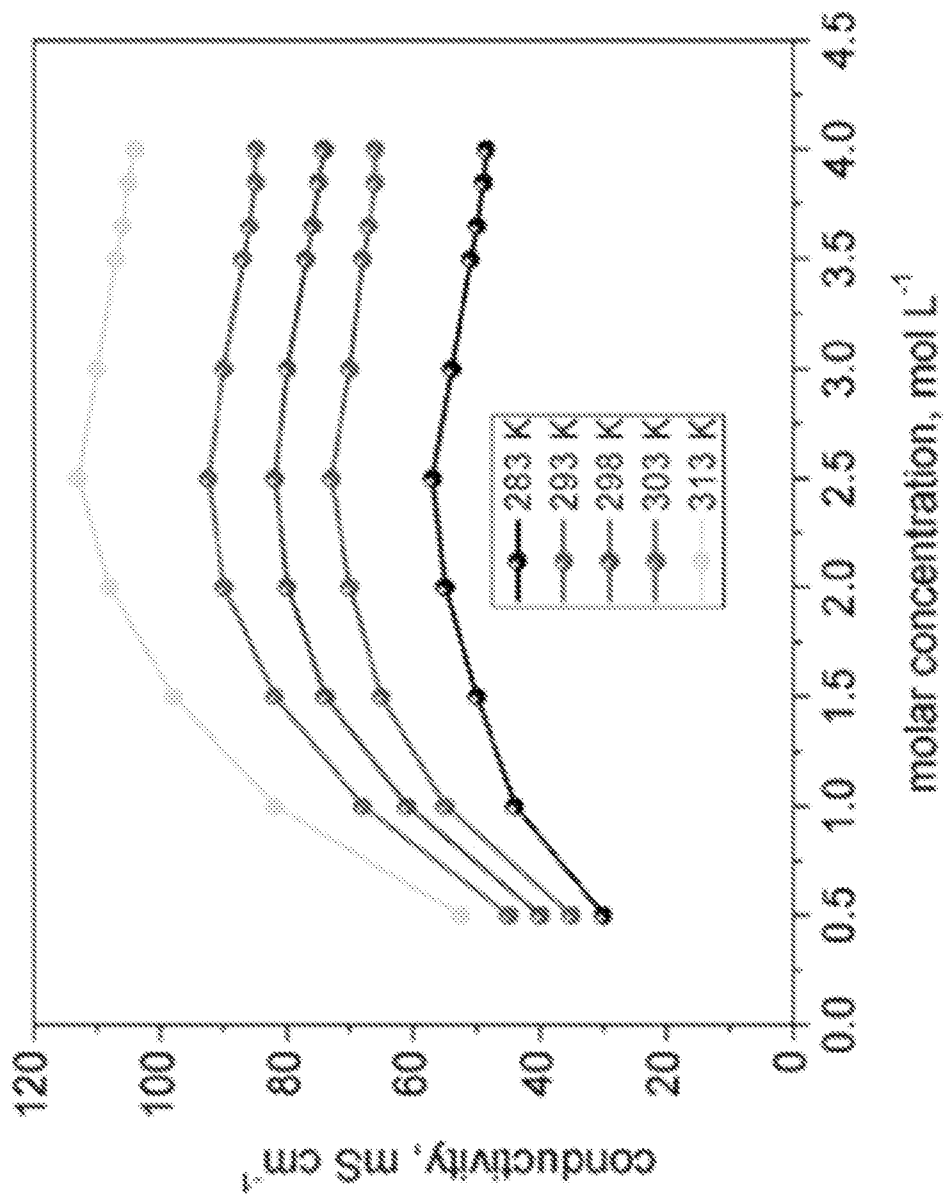
FIG. 8 is a graph showing the conductivity of a $Li_2SO_4$ electrolyte at different concentrations and temperatures.

In aqueous electrolytes, some water molecules bond with metal cations and inorganic anions generated by disassociation of salts. Among $K^+$, $Na^+$, and $Li^+$ cations, $Li^+$ has highest water solvation capability. $Li^+$ can bond with 27 water molecules (see Fic, supra), which significantly reduces the water activity, thus increasing the overpotential for $H_2$ and $O_2$ evolution. Among anions, $SO_4^{2-}$ is one of the strongest solvated inorganic anions with 40 water molecules bonded. The electrochemical stability window of 1 M $Li_2SO_4$ electrolyte can reach 2.2 V (see Fic, supra). It is expected that if salt concentration reaches saturation, almost all water molecules are bonded to the anion and cation, and water activity for decomposition into $H_2$ and $O_2$ will be minimized. As shown in FIG. 7, the electrochemical stability window of a saturated $Li_2SO_4$—$MgSO_4$ (1:1) electrolyte is 2.5 V. Despite the suppressed water activity, the ionic conductivity of $Li_2SO_4$ electrolytes do not suffer too much as the interested salt concentration. FIG. 8 shows the conductivity of a $Li_2SO_4$ electrolyte at different concentration and temperatures, in which a saturated $Li_2SO_4$—$MgSO_4$ electrolyte still provides 0.22 S/cm at room temperature, about 20-40 times higher than nonaqueous electrolytes.

In some embodiments, the aqueous electrolyte is a water-in-salt electrolyte. As used herein, the term "water-in-salt" means that the weight ratio of salt to solvent or volume ratio of salt to solvent exceed 1.0. In some embodiments, the weight or volume of salt is more than solvent.

In some embodiments, the molar ratio of salt to water in the water-in-salt electrolyte is between 0.5:1 and 200:1, between 0.5:1 and 150:1, between 0.5:1 and 100:1, between 0.5:1 and 50:1, between 0.5:1 and 10:1, between 0.5:1 and 5:1, between 0.5:1 and 1:1, between 0.8:1 and 200:1, between 0.8:1 and 150:1, between 0.8:1 and 100:1, between 0.8:1 and 50:1, between 0.8:1 and 10:1, between 0.8:1 and 5:1, between 0.8:1 and 1:1, between 1:1 and 200:1, between 1:1 and 150:1, between 1:1 and 100:1, between 1:1 and 50:1, between 1:1 and 10:1, or between 1:1 and 5:1.

In some embodiments, the weight percentage of salt in the water-in-salt electrolyte (wherein the weight percentage of the salt=((weight of salt/(weight of salt+weight of water))×100) is between 5% and 90%, between 10% and 90%, between 20% and 90%, between 30% and 90%, between 40% and 90%, between 50% and 90%, between 60% and 90%, between 70% and 90%, between 80% and 90%, between 5% and 80%, between 10% and 80%, between 20% and 80%, between 30% and 80%, between 40% and 80%, between 50% and 80%, between 60% and 80%, between 70% and 80%, between 5% and 70%, between 10% and 70%, between 20% and 70%, between 30% and 70%, between 40% and 70%, between 50% and 70%, between 60% and 70%, between 5% and 60%, between 10% and 60%, between 20% and 60%, between 30% and 60%, between 40% and 60%, between 50% and 60%, between 5% and 50%, between 10% and 50%, between 20% and 50%, between 30% and 50%, between 40% and 50%, between 5% and 40%, between 10% and 40%, between 20% and 40%, between 20% and 30%, between 5% and 30%, between 10% and 30%, between 20% and 30%, between 5% and 20%, between 10% and 20%, or between 5% and 10%.

In some embodiments, the water-in-salt electrolyte is a sulfone-based electrolyte such as $LiN(SO_2CF_3)_2$ (LiTFSI), $LiN(SO_2CH_3)_2$, $LiN(SO_2C_4H_9)_2$, $LiN(SO_2C_2F_5)_2$ (LiBETI), $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$ (LiFSI), or $LiN(SO_2F)(SO_2CF_3)$ (LiFTI). In some embodiments, the aqueous electrolyte is $LiN(SO_2CF_3)_2$.

In some embodiments, the aqueous electrolyte is $LiPF_6$ or $LiSO_3CF_3$.

In some embodiments, the aqueous electrolyte is a water-in-Mg-salt electrolyte. In some embodiments, the water-in-Mg-salt electrolyte is $LiSO_4$—$MgSO_4$, LiCl—$MgCl_2$, or $Li(NO_3)$—$Mg(NO_3)_2$.

In some embodiments, the aqueous electrolyte is a high voltage aqueous electrolyte.

In some embodiments, the aqueous electrolyte contains a significant amount of water (i.e., not merely a trace amount), and the electrolyte is disposed in the cell such that it directly contacts the cathode. In certain embodiments water serves as the main liquid solvent of the electrolyte. In some embodiments, water is the only electrolyte solvent.

In some embodiments, a significant (non-trace) amount of water is incorporated in the electrolyte. In some embodiments the volume percent of water in the electrolyte relative to the total liquid solvent volume is greater than 5%, 10%, 20%, 30%, 40%, 50%, 60%, 70%, 80%, or 90%. In some embodiments water is the only liquid solvent in the electrolyte (i.e., water constitutes 100% of the solvent volume of the electrolyte). In some embodiments water is the main solvent in the electrolyte. In some embodiments, the volume percent of water in the electrolyte is between 5% and 90%, between 10% and 90%, between 20% and 90%, between 30% and 90%, between 40% and 90%, between 50% and 90%, between 60% and 90%, between 70% and 90%, between 80% and 90%, between 5% and 80%, between 10% and 80%, between 20% and 80%, between 30% and 80%, between 40% and 80%, between 50% and 80%, between 60% and 80%, between 70% and 80%, between 5% and 70%, between 10% and 70%, between 20% and 70%, between 30% and 70%, between 40% and 70%, between 50% and 70%, between 60% and 70%, between 5% and 60%, between 10% and 60%, between 20% and 60%, between 30% and 60%, between 40% and 60%, between 50% and 60%, between 5% and 50%, between 10% and 50%, between 20% and 50%, between 30% and 50%, between 40% and 50%, between 5% and 40%, between 10% and 40%, between 20% and 40%, between 20% and 30%, between 5% and 30%, between 10% and 30%, between 20% and 30%, between 5% and 20%, between 10% and 20%, or between 5% and 10%.

In some embodiments, the pH of the aqueous electrolyte solution is between 7 and 11. In some embodiments, the pH of the aqueous electrolyte solution is greater than 6, 7, 8, 9, 10, 11, 12, or 13. In some embodiments, the pH of the aqueous electrolyte solution is between 5 and 14, between 5 and 13, between 5 and 12, between 5 and 11, between 5 and 10, between 5 and 9, between 5 and 8, between 6 and 14, between 6 and 13, between 6 and 12, between 6 and 11, between 6 and 10, between 6 and 9, between 6 and 8, between 7 and 14, between 7 and 13, between 7 and 12, between 7 and 11, between 7 and 10, between 7 and 9, between 7 and 8, between 8 and 14, between 8 and 13, between 8 and 12, between 8 and 11, between 8 and 10, or between 8 and 9. In some embodiments, the pH can be tailored using pH adjusting additives including basic salts, acidic salts, and buffering agents. In some embodiments, the pH is adjusted using LiOH.

In some embodiments, the electrolyte is formulated to have a pH that is acidic (pH<7), basic (pH>7), or neutral (pH about 7).

In some embodiments, the aqueous electrolyte further comprises one or more non-aqueous solvents. In some embodiments, the volume percent of non-aqueous solvents in the electrolyte ranges is between 1% and 10%, between 10% and 20%, between 20% and 30%, between 30% and 40%, between 40% and 50%, between 50% and 60%, between 60% and 70%, between 70% and 80%, or between 80% and 90%.

In some embodiments, the anode and cathode cell contain the same electrolyte. In some embodiments, the anode and cathode cell contain different electrolytes.

In some embodiments, the non-aqueous solvent is a aprotic, protic organic solvents (solids and liquids, typically liquids or solid polyethylene oxide), or ionic liquid. In some embodiments, the non-aqueous solvent is a protic organic solvents.

In some embodiments, suitable non-aqueous aprotic and protic solvents include ethers (e.g., 2-Methyltetrahydrofuran (2-MeTHF), Tetrahydrofuran (THF), 4-Methyldioxolane (4-MeDIOX), Tetrahydropyran (THP) and 1,3-Dioxolane (DIOX)) glymes (e.g., 1,2-dimethoxyethane (DME/monoglyme), di-glyme, tri-glyme, tetra-glyme and higher glymes), carbonates (e.g., cyclic carbonates such as propylene carbonate (PC), ethylene carbonate (EC), acyclic carbonates such as dimethyl carbonate (DMC), ethylmethyl carbonate (EMC) and diethyl carbonate (DEC), formates (e.g., Methyl Formate) and butyrolactone (GBL). Other suitable aprotic solvents include those having a high donor number (i.e., donor solvents) such as hexamethylphosphoramide, pyridine, N,N-diethylacetamide (DMAC), N,N-diethylformamide, dimethylsulfoxide (DMSO), tetramethylurea (TMU), N,N-dimethylacetamide, N,N-dimethylformamide (DMF), tributylphosphate, trimethylphosphate, N,N,N',N'-tetraethylsulfamide, tetraethylenediamine, tetramethylpropylenediamine, and pentamethyldiethylenetriamine. In some embodiments, the donor solvents have a donor number of at least 15, between about 15 and 40, or between about 18-40. In some embodiments, donor solvents include N,N-diethylformamide, N,N-dimethylformamide (DMF), dimethylsulfoxide (DMSO), N,N-dimethylacetamide (DMAC); for example, DMF. Suitable acceptor solvents which can be characterized as Lewis acids (they may be protic or aprotic solvents) and promote solvation of anions. Examples include alcohols such as methanol, glycols such as ethylene glycol and polyglycols such as polyethylene glycol as well as nitromethane, triflouroacetic acide, trifluoromethanesulfonic acid, sulfur dioxide and boron triflouride, and ethylene glycol (EG). Others include nitriles (e.g., acetonitrile (AN), higher nitriles, propionitrile, succinonitrile, butyronitrile, benzonitrile), amides (e.g., formamide, N-methylformamide, N,N-dimethylformamide, N,N-diethylformamide, (DMF), acetamide, N-methylacetamide, N,N-dimethylacetamide (DMAC), N,N-diethylacetamide, N,N,N'N'tetraethylsulfamide, tetramethylurea (TMU), 2-pyrrolidone, N-methylpyrrolidone, N-methylpyrrolidinone), amines (e.g., butylamine, ehtylenediamine, triethylamine, pyridine, 1,1,3,3-tetramethylguanidine (TMG), tetraethylenediamine, tetramethylpropylenediamine, pentamethyldiethylenetriamine, organosulfur solvents (e.g., dimethylsulfoxide (DMSO), sulfolane, other sulfones, dimethylsulfite, ethylene sulfite, and organophosphorous solvents (e.g., tributylphosphate, trimethylphosphate, hexamethylphosphoramide (HMPA)).

In some embodiments, a non-aqueous solvent may be added to the aqueous electrolyte to affect dissolution. In some embodiments, the solvent is toluene or carbon disulfide.

The use of non-aqueous solvents such as aprotic organic solvents, typically liquids, is not limited as such, and may be useful for facilitating the dissolution of high order polysulfide species. Protic solvents and ionic liquids may also be incorporated in the aqueous electrolyte to further enhance dissolution of lithium sulfide or more generally improve cell performance.

In some embodiments, the electrolyte is formulated with an amount of a non-aqueous protic solvent to achieve a desired freezing point temperature (i.e., a melt temperature). In some embodiments, the electrolyte is formulated to have a melt temperature of less than 0° C., less than −5° C., less than −10° C., less than −15° C., less than −20° C., less than −25° C., less than −30° C., less than −35° C., or less than −40° C.

In some embodiments, the electrochemical cell operates at a temperature of less than about 100° C., less than about 90° C., less than about 80° C., less than about 70° C., less than about 60° C., less than about 50° C., less than about 40° C., less than about 30° C., less than about 20° C., or less than about 10° C. In some embodiments, the electrochemical cell operates at a temperature between −40° C. and 100° C., between −40° C. and 90° C., between −40° C. and 80° C., between −40° C. and 70° C., between −40° C. and 60° C., between −40° C. and 50° C., between −40° C. and 40° C., between −40° C. and 30° C., between −30° C. and 100° C., between −30° C. and 90° C., between −30° C. and 80° C., between −30° C. and 70° C., between −30° C. and 60° C., between −30° C. and 50° C., between −30° C. and 40° C., between −30° C. and 30° C., between −20° C. and 100° C., between −20° C. and 90° C., between −20° C. and 80° C., between −20° C. and 70° C., between −20° C. and 60° C., between −20° C. and 50° C., between −20° C. and 40° C., or between −20° C. and 30° C.

In some embodiments, the electrochemical cell has a full cell output voltage greater than 1.5 V, greater than 1.6 V, greater than 1.7 V, greater than 1.8 V, greater than 1.9 V, or greater than 2.0 V. In some embodiments, the electrochemical cell has a fuel cell output voltage between 1.0 V and 4.0 V, between 1.0 V and 3.5 V, between 1.0 V and 3.0 V, between 1.0 V and 2.5 V, between 1.0 V and 2.0 V, between 1.0 V and 1.5 V, between 1.5 V and 4.0 V, between 1.5 V and 3.5 V, between 1.5 V and 3.0 V, between 1.5 V and 2.5 V, between 1.5 V and 2.0 V, between 2.0 V and 4.0 V, between 2.0 V and 3.5 V, between 2.0 V and 3.0 V, between 2.0 V and 2.5 V, between 2.5 V and 4.0 V, between 2.5 V and 3.5 V, or between 2.5 V and 3.0 V.

In another embodiment, the disclosure provides an aqueous electrolyte battery comprising:

(a) an anode;

(b) comprising $Mg_{0.05}AOOH$, wherein A is a metal or an alloy of a metal; and (c) an aqueous electrolyte.

In some embodiments, the aqueous electrolyte battery includes a separator between the positive electrode and the negative electrode. In some embodiments, the separator is subjected to hydrophilic treatment or perforated such that the separator can be permeated with an aqueous electrolyte solution, allowing ions to pass through the separator. The separator may be any separator that is commonly used in batteries. Examples of the separator include polymer non-woven fabrics, such as polypropylene nonwoven fabric and poly(phenylene sulfide) nonwoven fabric, and macroporous membranes of olefin resins, such as polyethylene and polypropylene. These can be used alone or in combination.

The present invention also provides methods of manufacture of the aqueous electrolyte battery. In some embodiments, the method involves de-oxygenating the electrolyte and forming and sealing the cell in an inert or reducing environment devoid of molecular oxygen (e.g., a nitrogen environment) in order to reduce or eliminate free oxygen in the electrolyte solution. In this way the irreversible oxidation in the aqueous electrolyte and the resultant loss of material, is avoided.

In some embodiments, the cells are self-contained and sealed in a hermetic casing wherein the entirety of the cell is derived from and disposed in the casing during cell manufacture. These fully sealed cells may be secondary cells. In some embodiments, the casing comprises one layer. In some embodiments, the casing comprises more than one layer. In some embodiments, the casing comprises at least one layer selected from a polyethylene terephthalate layer, a polymer layer, and a propylene layer. In some embodiments, the casing comprises at least one carbonized plastic layer.

In some embodiments, the cells are configured in a battery flow cell system, wherein the aqueous electrolyte is caused to flow and/or circulate into the cell. In some embodiments, the aqueous electrolyte is caused to flow and/or circulate through an inter-electrode region between the anode and the cathode. In some embodiments, the electrolyte in the anode and the cathode are the same. In some embodiments, the electrolyte in the anode and the cathode are different. In some embodiments, the electrolyte in the anode and the cathode are flowable and during operation are caused to flow through the cell.

An aqueous electrolyte battery according to the present invention may be of any shape, such as coin-shaped, button-shaped, sheet-shaped, layered, cylindrical, flat, or square. An aqueous secondary battery according to the present invention may be applied to large objects, such as electric vehicles.

In some embodiments, the aqueous electrolyte battery is a secondary battery.

The following examples are illustrative and non-limiting of the electrochemical cells, methods of making, and methods of using described herein. Suitable modifications and adaptations of the variety of conditions, formulations and other parameters normally encountered in the field and which are obvious to those skilled in the art in view of this disclosure are within the spirit and scope of the invention.

EXAMPLES

Example 1

Figure 9A:
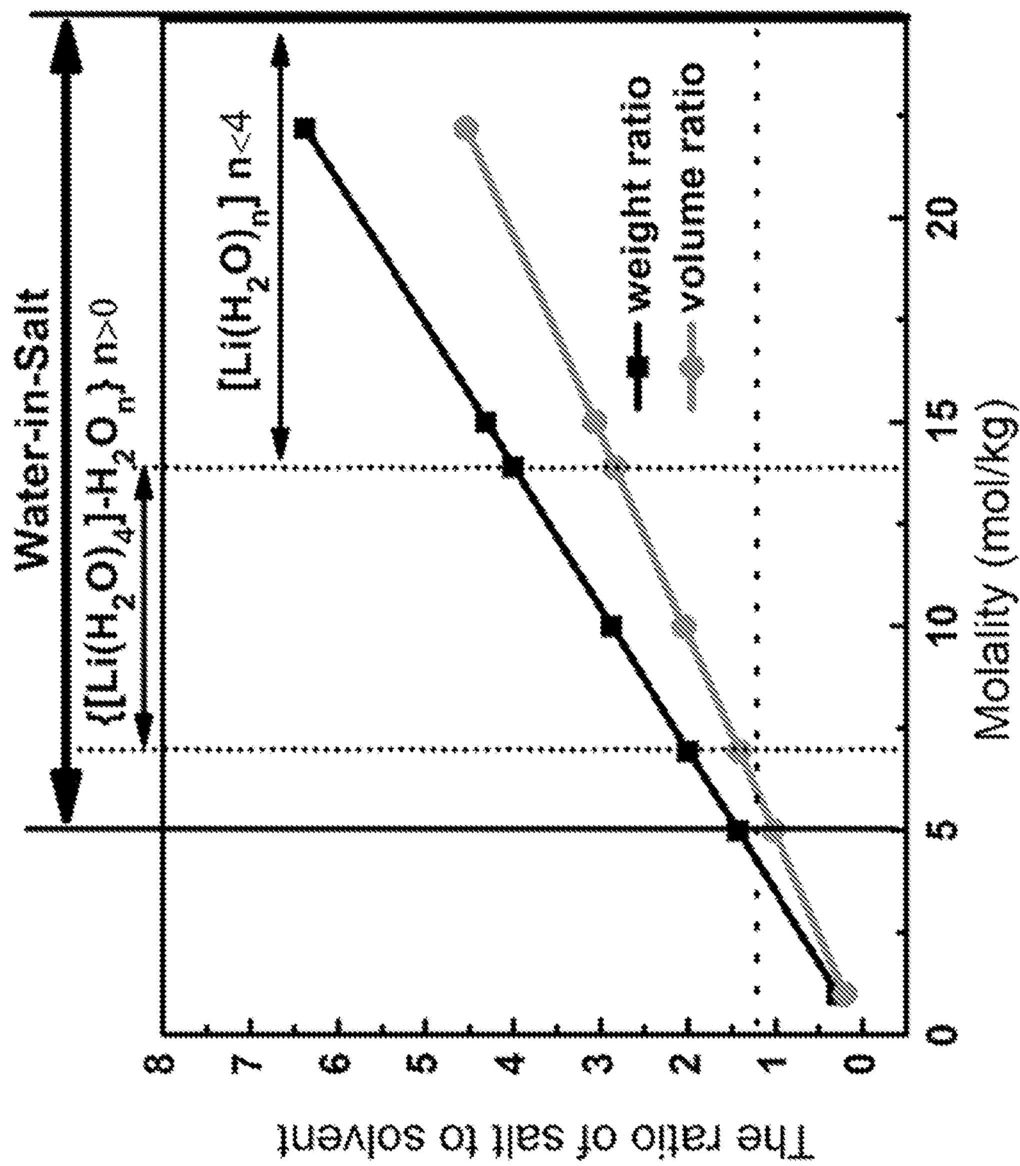
FIG. 9A is a graph of a LiTFSI—$H_2O$ electrolyte showing the weight and volume ratio of salt to solvent with the increase in electrolyte molarity.
Figure 9B:
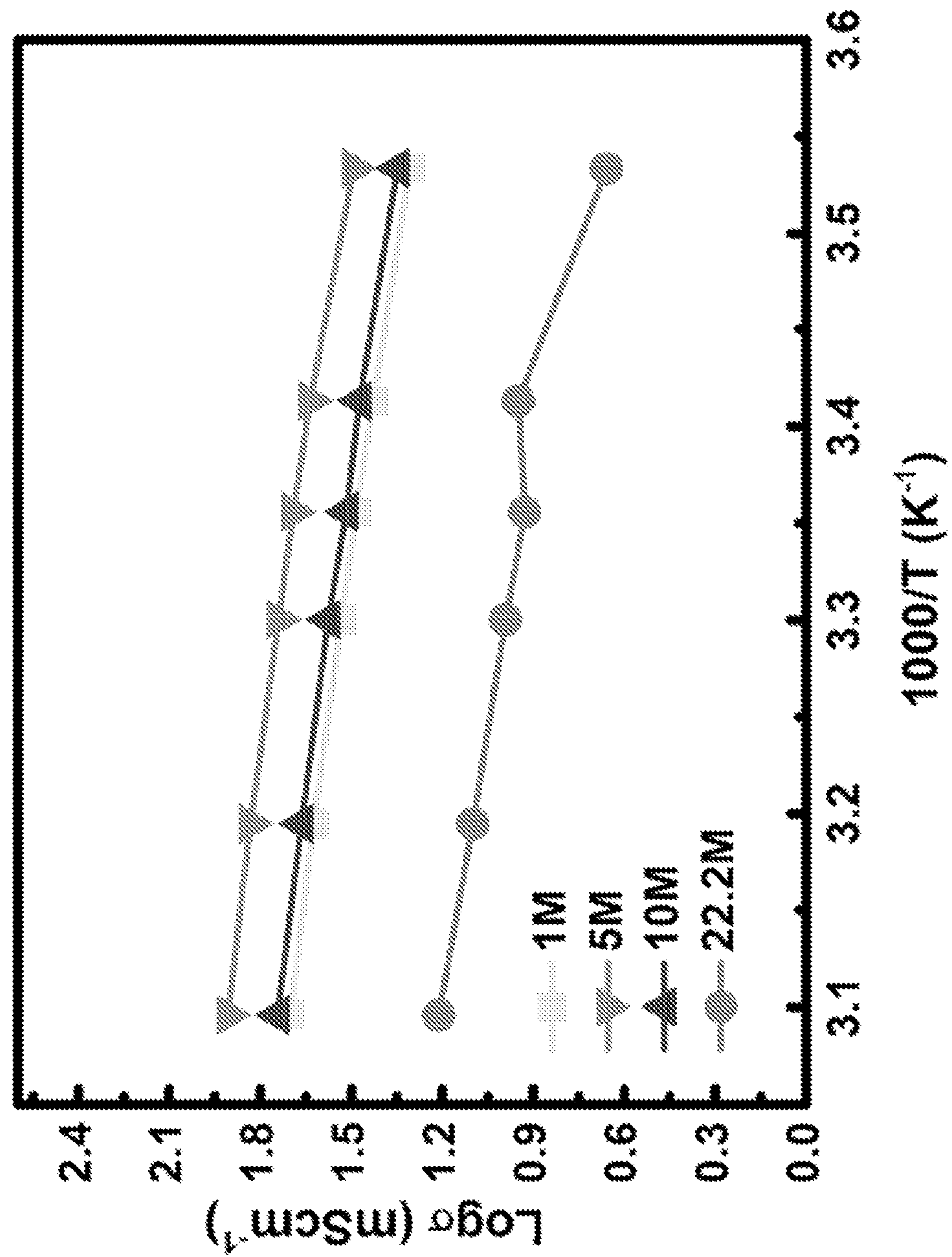
FIG. 9B is a graph of a LiTFSI—$H_2O$ electrolyte at different molarities (1 m, 5 m, 10 m, and 22.2 m) showing the Arrhenius relation of σ and 1000/T in a temperature range of between 10° C. to about 50° C.
Figure 9C:
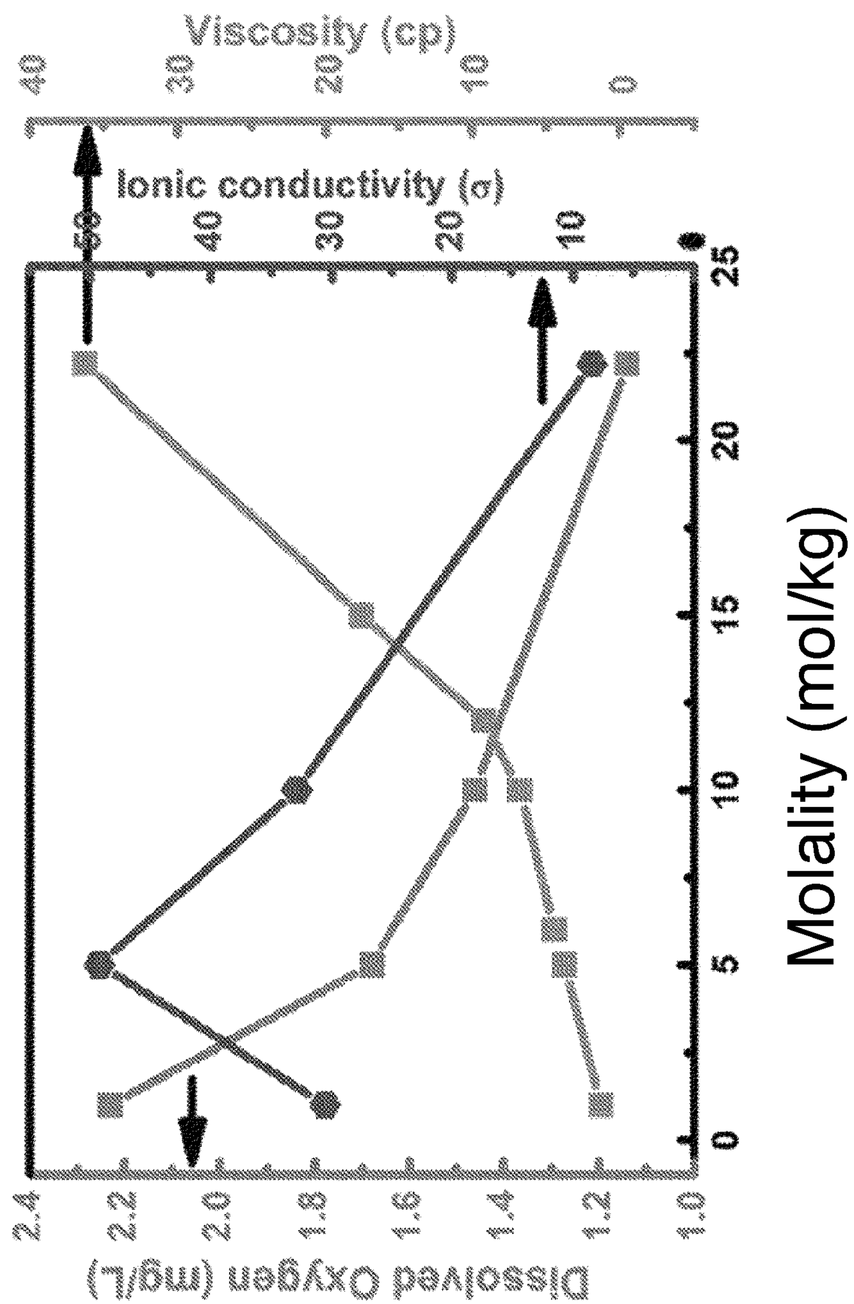
FIG. 9C is a graph of a LiTFSI—$H_2O$ electrolyte showing the dissolved oxygen content, ionic conductivity, and viscosity at room temperature.
Figure 9D:
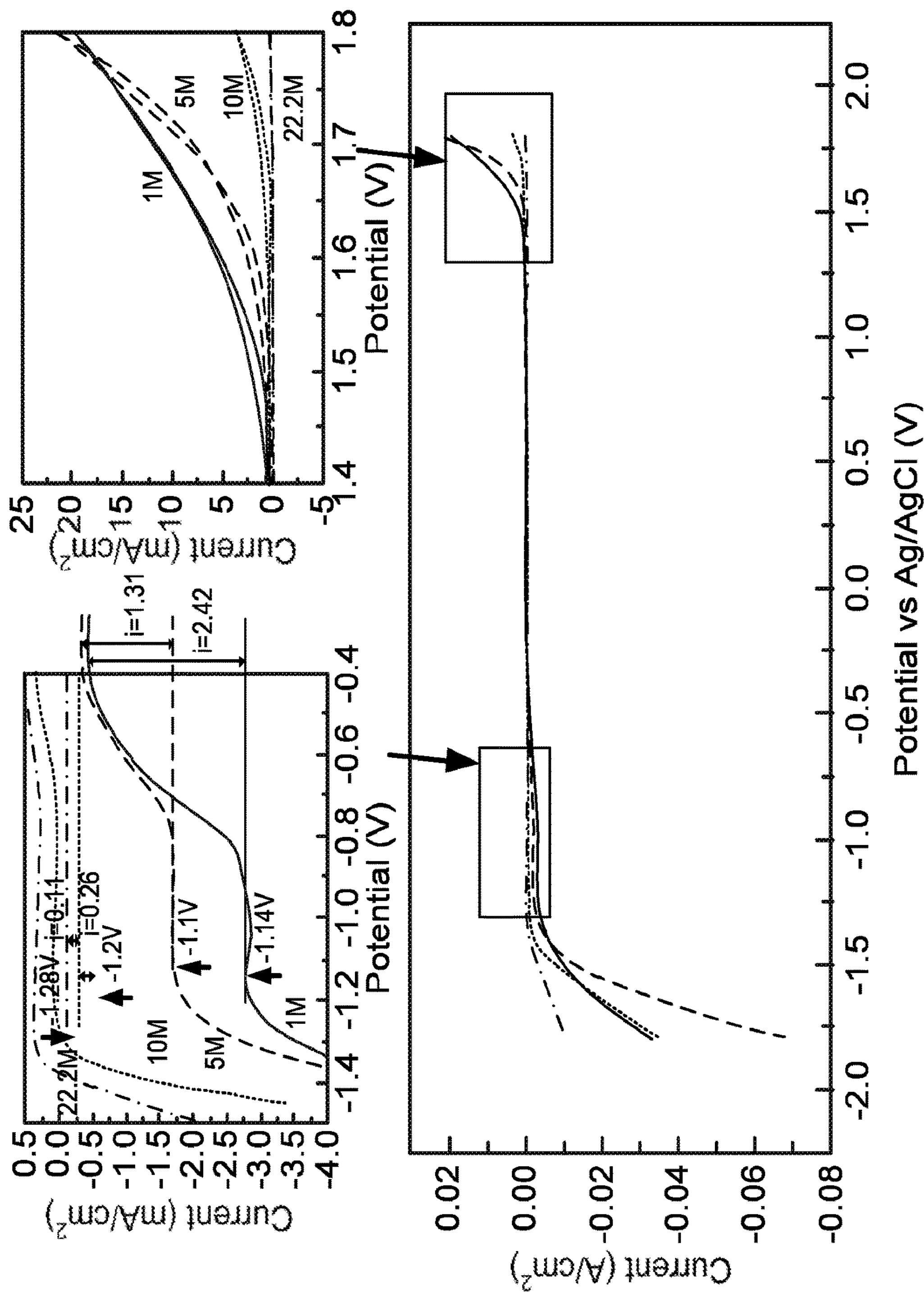
FIG. 9D is a graph of a LiTFSI—$H_2O$ electrolyte at different molarities (1 m, 5 m, 10 m, and 22.2 m) showing the stable electrochemical window measured by cyclic voltammetry (1.8 to about −1.8 V vs Ag/AgCl, 10 mV/s).
Figure 10A:
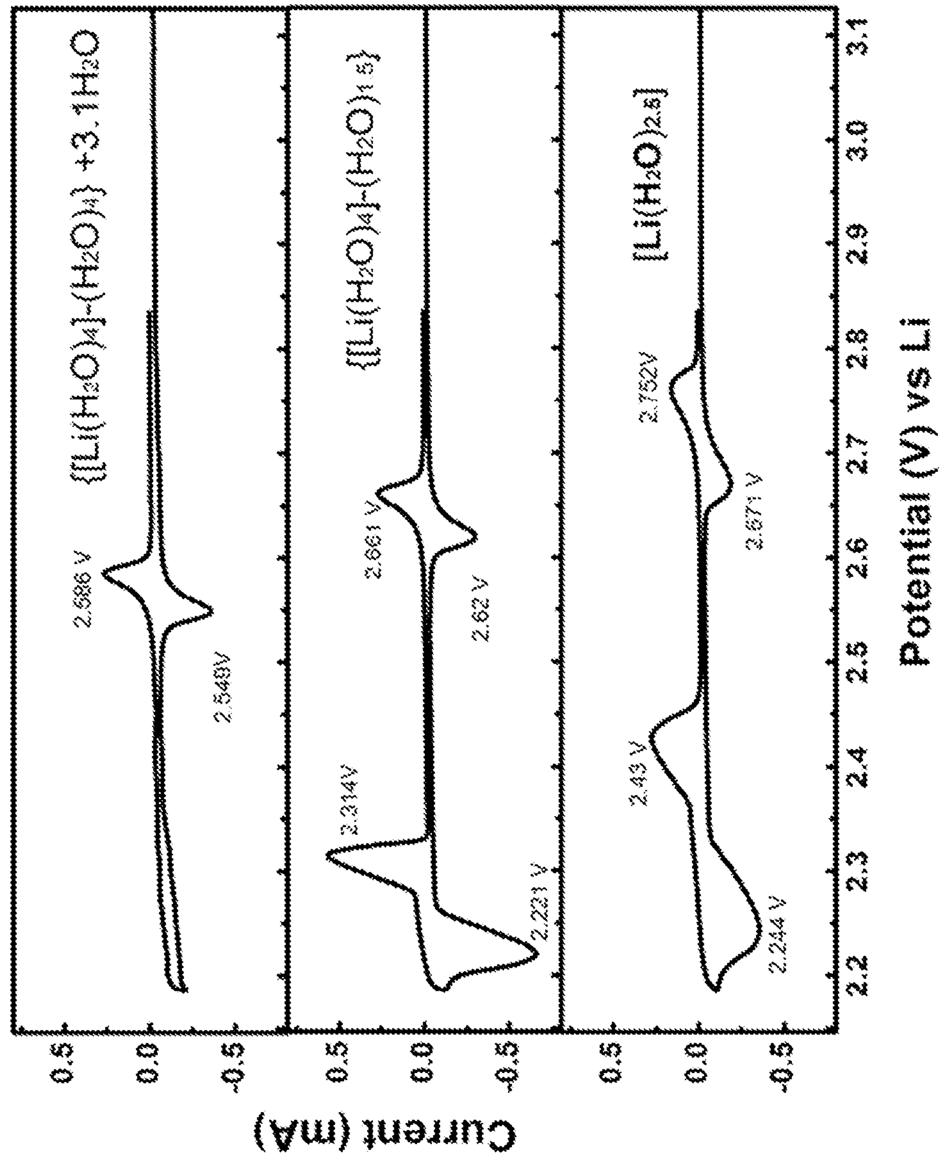
FIG. 10A is a cyclic voltammetry plot showing measurements of $Mo_3S_4$ in different molarity electrolytes (5 m, 10 m, and 22.2 m) at 0.1 mV/s. The measurements follow the order 5 m, 10 m, and 22.2 m and the scanning potential range is set up at −1.05 to about 0 V.
Figure 10B:
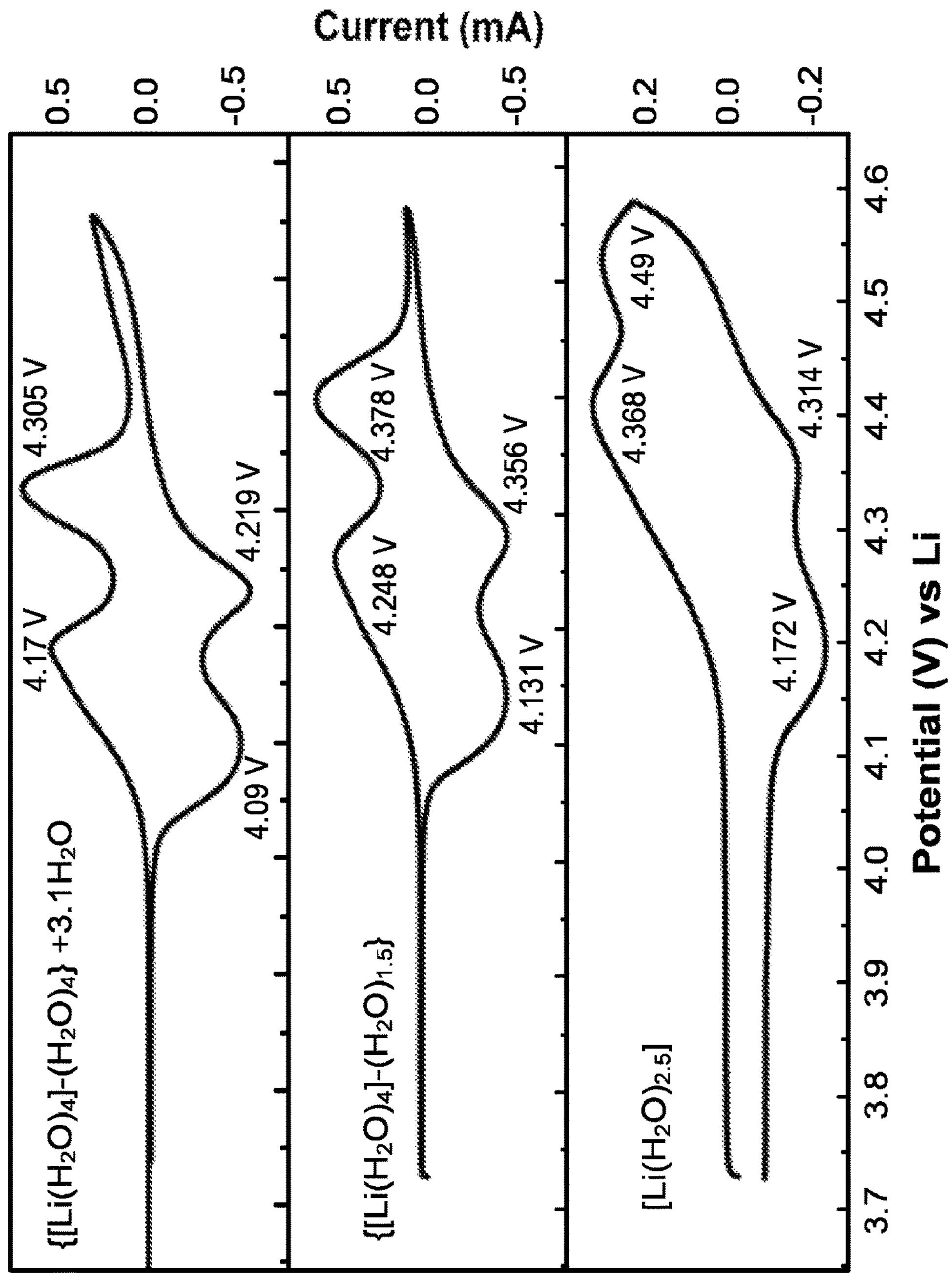
FIG. 10B is a cyclic voltammetry plot showing measurements of $LiMn_2O_4$ in different molarity electrolytes (5 m, 10 m, and 22.2 m) at 0.1 mV/s. The measurements follow the order 5 m, 10 m, and 22.2 m and the scanning potential range is set up at 0.5 to about 1.3 V.

The physicochemical and electrochemical properties of different ratio of $LiN(SO_2CF_3)_2$ (LiTFSI) to $H_2O$ are shown in FIGS. 9A-D. Based on the ratio of salt to solvent by weigh and volume in a binary electrolyte system (FIG. 9A), when the molality increases to 5 mol/kg, the weight ratio of salt to solvent exceeds 1.0. From this point, the system can be defined as "water-in-salt," which could also be considered liquid water is dissolved into solid LiTFSI. In this case, the physicochemical and electrochemical properties will go through a fundamental change, due to the variation of interaction between cation and water (the structure and dynamic of hydration ion), cation and anion (lattice energy) and so on. The variation of ionic conductivity as a function of temperature for different ratios of LiTFSI to $H_2O$ is shown in FIG. 10B. As shown in FIG. 9B, an ionic conductivity of 22.2 m slight shows a slight decrease due to high viscosity compared to lower molality ratios. Nevertheless, the conductivity of the 22.2 m sample at 25° C. shows an ionic conductivity of 8 mS/cm which is close to that of a commercial lithium ion organic electrolyte (FIG. 9C). The variation of dissolved oxygen content at room temperature tends to decrease monotonically with increasing LiTFSI content in the LiTFSI—$H_2O$ binary composition (FIG. 9C). In general, the solubility of dissolved oxygen in water is affected significantly by the presence of other solutes in the solution. When LiTFSI is dissolved in water, the cations ($Li^+$) attract water molecules, which has the tendency to decrease the weak affinity of non-polar oxygen molecules to water and drive the dissolved oxygen out of the polar water. The stable electrochemical window is presented in FIG. 9D. FIG. 9D shows that the oxygen and hydrogen evolution potential are expanded significantly by adjusting the ratio of LiTFSI to Water. For the 22.2 m sample, both the amount of hydrogen and oxygen evolution per unit current collector area is suppressed significantly beyond the range of water window. Meanwhile, the enlarged graph of the anodic potential shows that anodic current of all the electrolytes occur at −0.4 V vs Ag/AgCl reference, however, with the decreasing of scanning potential, anodic current does not continues to increase but remains stable at a fixed value in a certain range, and the anodic current decreases an order of magnitude from 2.41 uA/cm² (5 m) to 0.11 uA/cm² (22.2 m) and there is a noticeable increase in current starting at −1.3 V vs Ag/AgCl corresponding to hydrogen evolution potential.

Example 2

The Nernst equation relates the chemical reaction energy to electrolyte energy:

$$E = E^0 + \frac{kT}{q}\ln Q$$

wherein:

E=energy at a given concentration

E°=energy at standard 1 molar concentration

Q=molar concentration kT/q=26 mV at 298° K

Figure 10C:
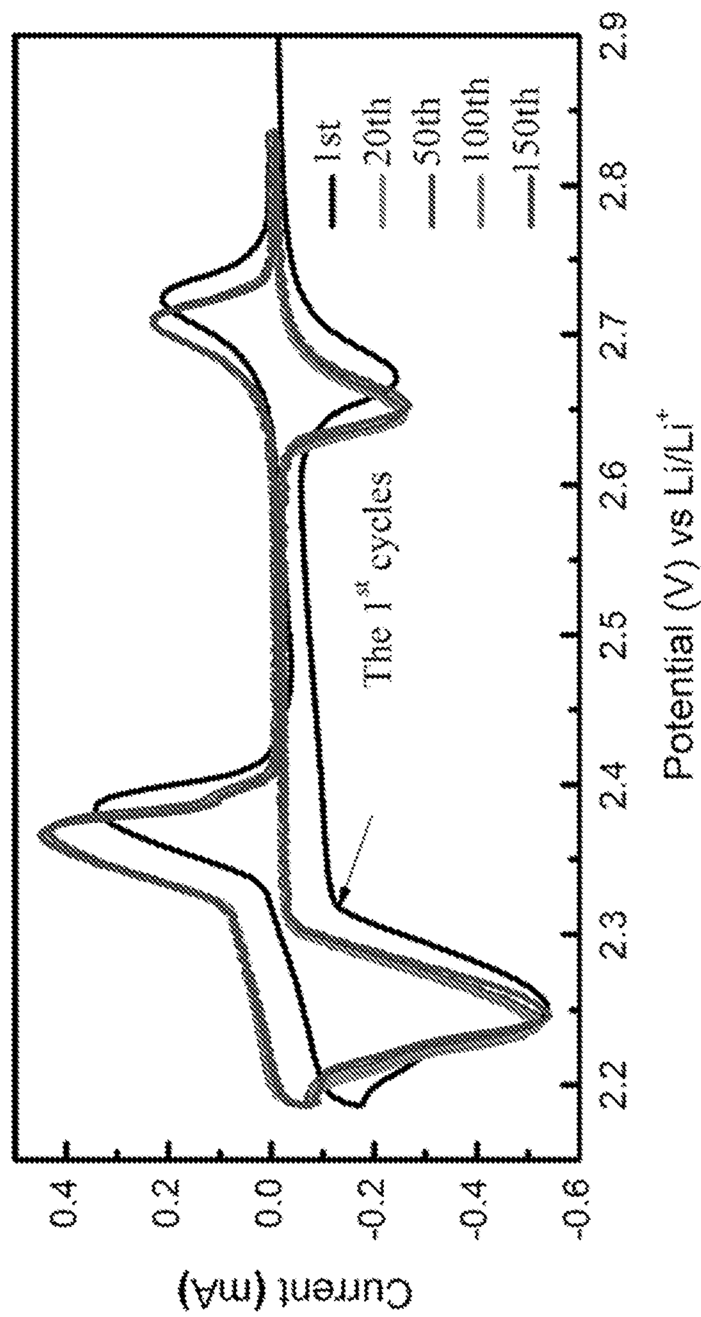
FIG. 10C is a plot showing cyclic voltammetry measurements of $Mo_3S_4$ with a 22.2 m electrolyte at a scanning rate of 0.1 mV/s.
Figure 11A:
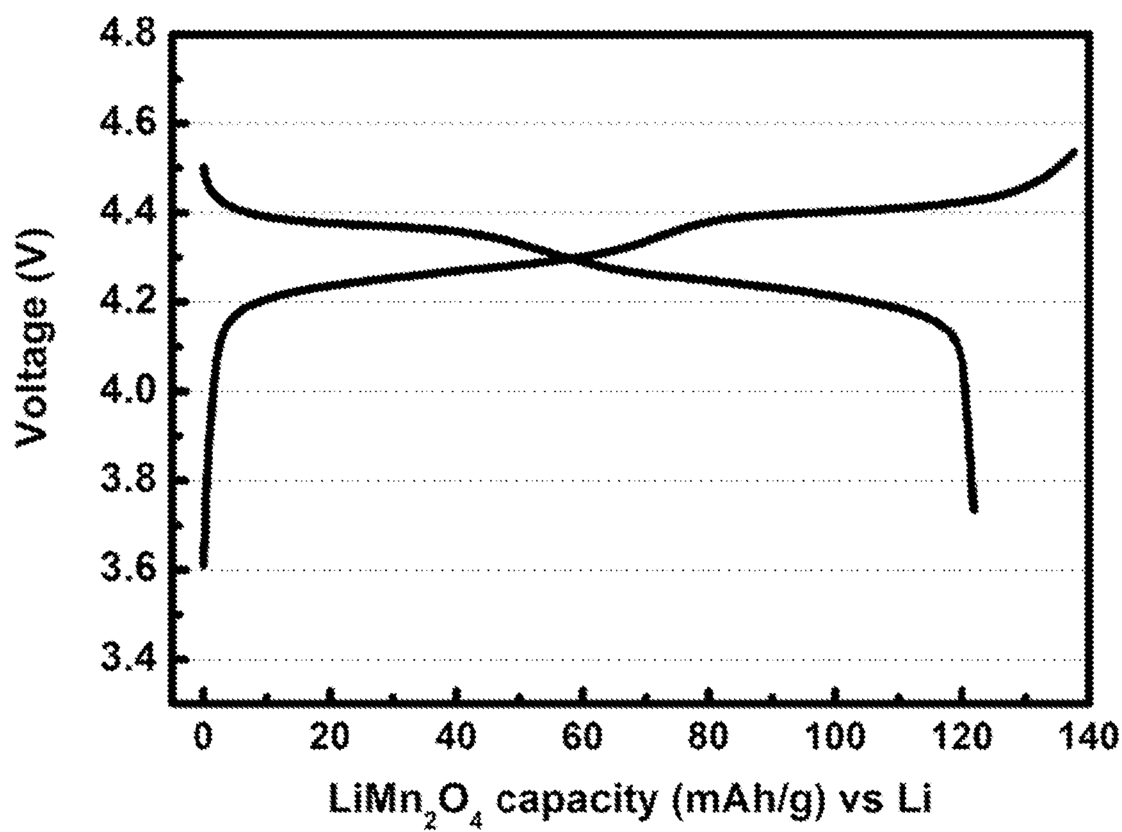
FIG. 11A is a graph of the discharge-charge profile of $LiMn_2O_4$ at 0.2 C in a 22.2 m electrolyte in three-electrode devices.
Figure 11B:
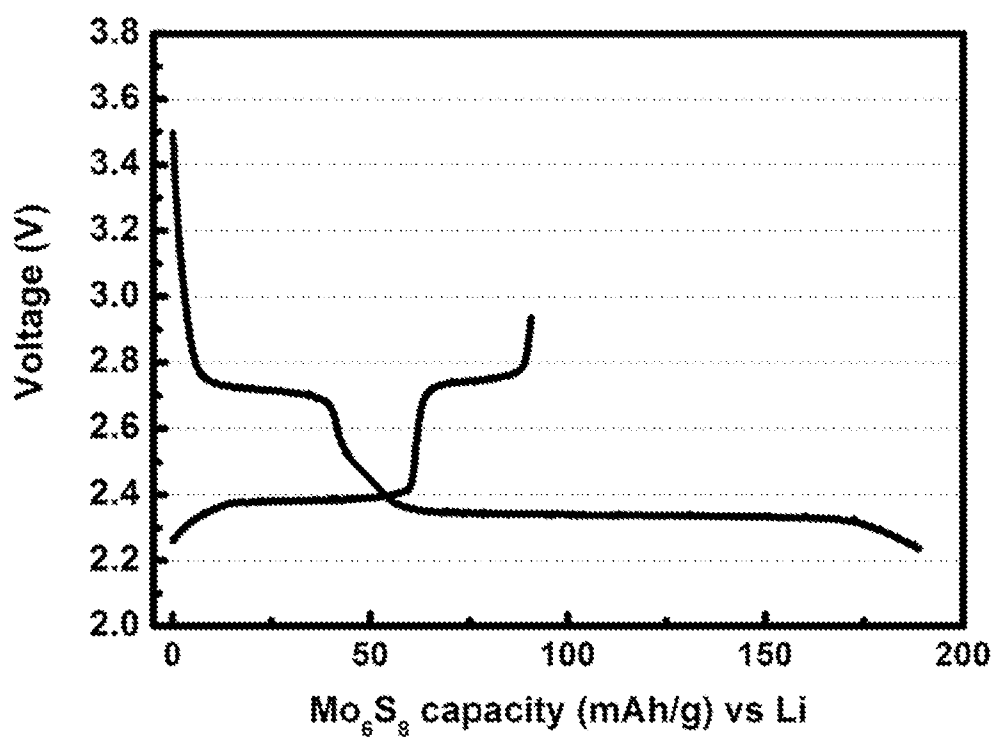
FIG. 11B is a graph of the discharge-charge profile of $Mo_3S_4$ at 0.2 C in a 22.2 m electrolyte in three-electrode devices.
Figure 19:
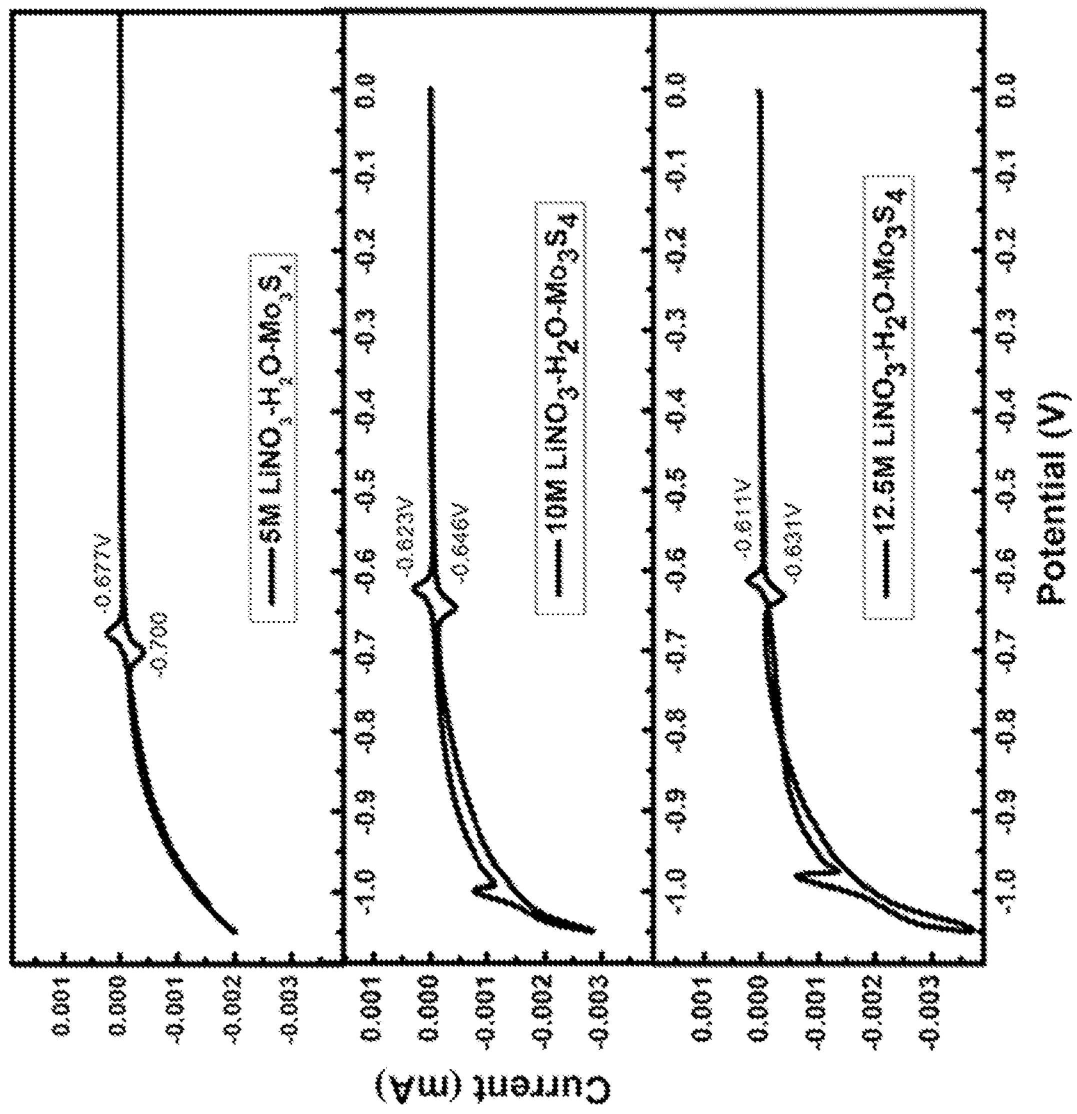
FIG. 19 is a cyclic voltammetry plot showing measurements of $Mo_3S_4$ in $LiNO_3$—$H_2O$ with different molarity electrolytes (5 m, 10 m, and 12.5 m) at 0.1 mV/s.
Figure 20:
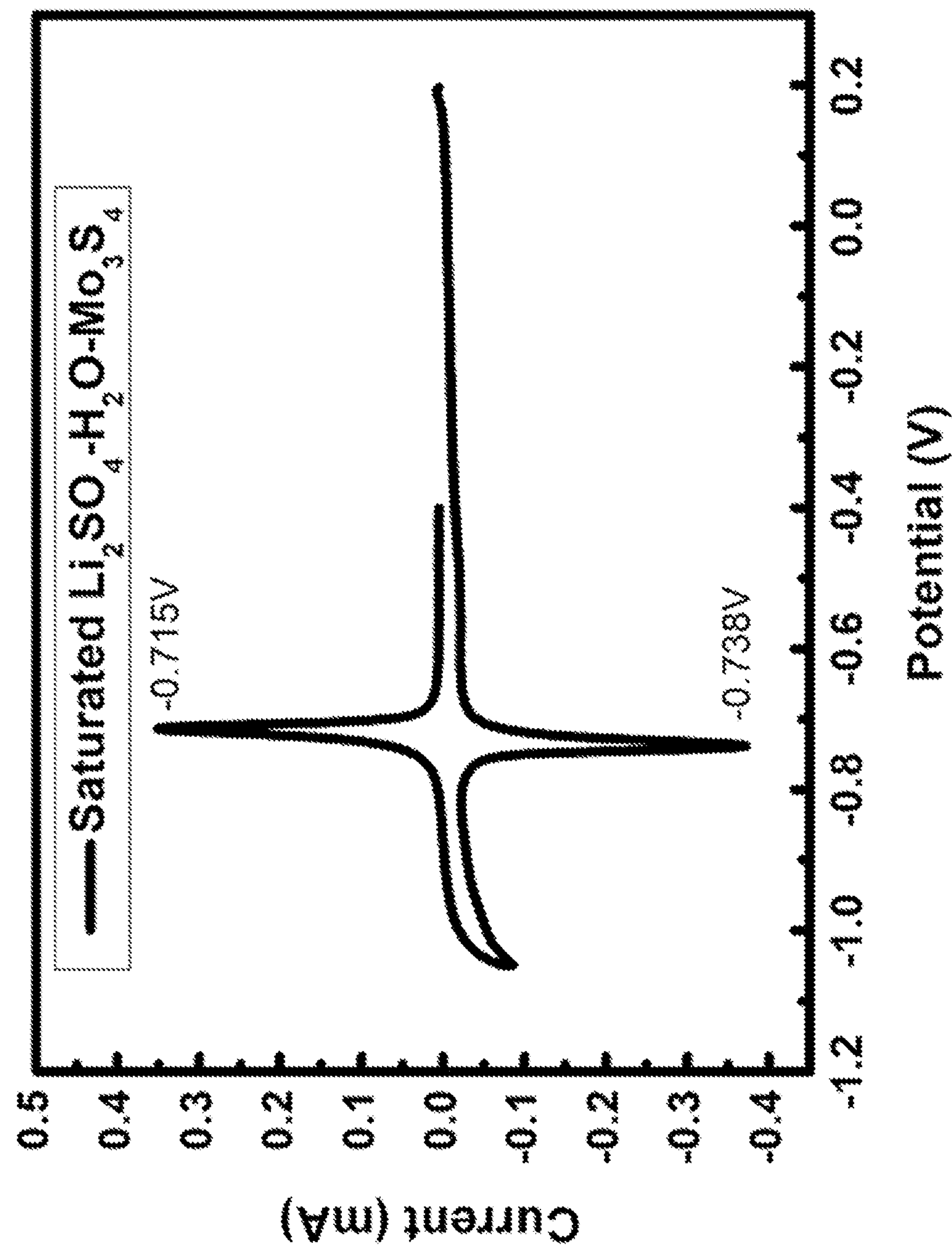
FIG. 20 is a cyclic voltammetry plot showing measurements of $Mo_3S_4$ in statured $Li_2SO_4$—$H_2O$ at 0.1 mV/s.

Based on the Nernst equation, the potential of an electrode in a half-cell is determined by lithium ion activity in the electrolyte. In order to capture this trend, absolute electrode potentials in different ratios of LiTFSI to $H_2O$ were recorded in three electrode systems using cyclic voltammetry (CV) (FIG. 10 ($LiMn_2O_4$) and 10A ($Mo_3S_4$)). FIGS. 10A and 10B show that both $LiMn_2O_4$ and $Mo_3S_4$ absolute electrode potentials are evidently increased by the increased ratio of salt to solvent, and this absolute electrode potential adjustment neither influences the full-cell output voltage nor makes the anode potential move into the electrolyte window. As control experiments, traditional aqueous electrolytes with different $LiNO_3$ concentrations and saturated $Li_2SO_4$ (<3 m) were also tested (FIGS. 19 and 20). As seen in FIGS. 19 and 20, with increasing salt concentration, the electrode absolute potential shifted into high voltage; however, due to the limitation of the inorganic lithium salt's solubility in water, the variation was confined to a small amplitude. In addition, hydrogen evolution took place apparently in the low potential range (<0.8 V vs Ag/AgCl), even at the highest $LiNO_3$ concentration (12.5 M)—close to saturation.

Example 3

Figure 12A:
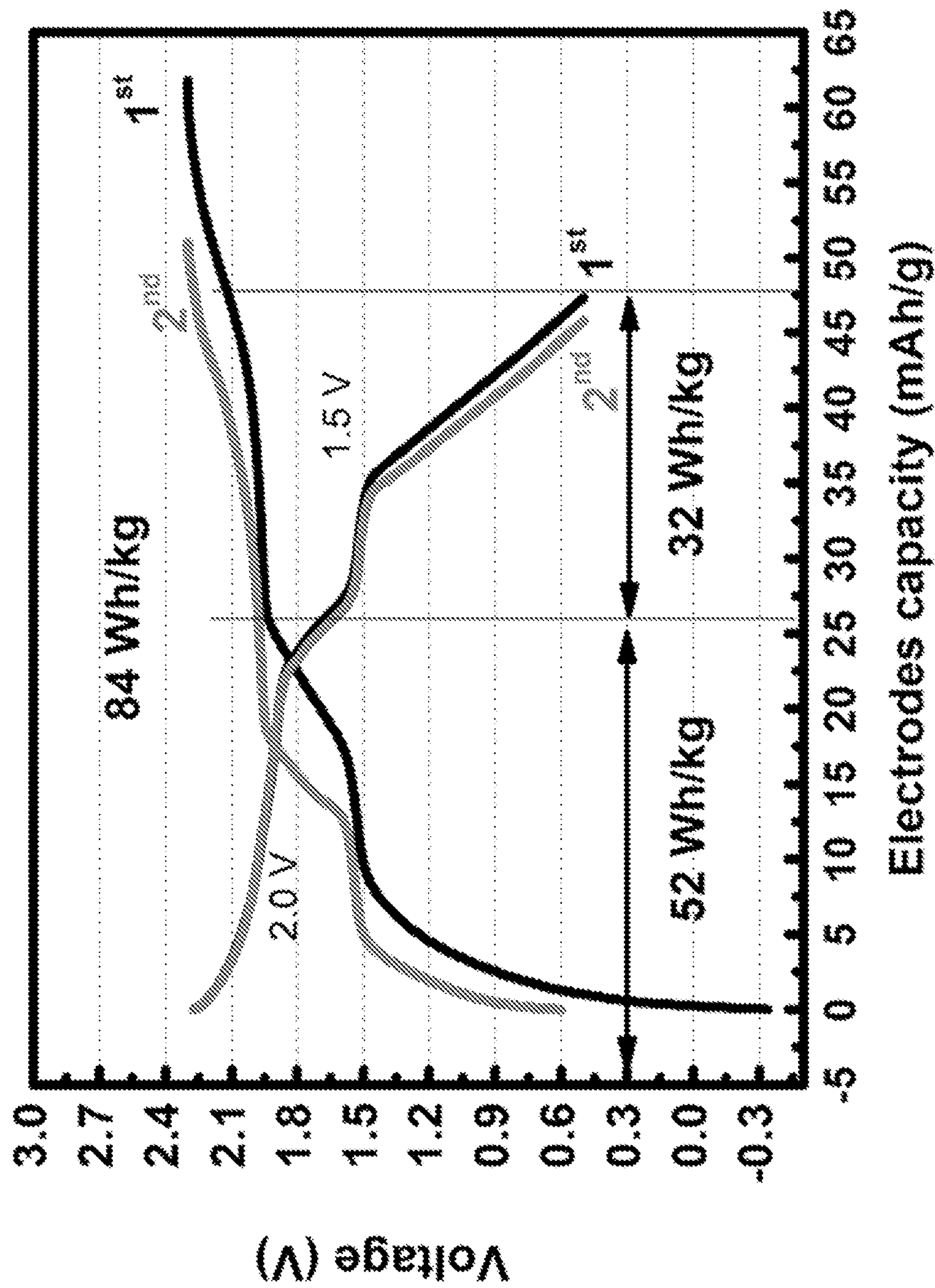
FIG. 12A is a graph depicting the charge/discharge of $LiMn_2O_4/Mo_3S_4$ full cell in a water-in-salt electrolyte.
Figure 12B:
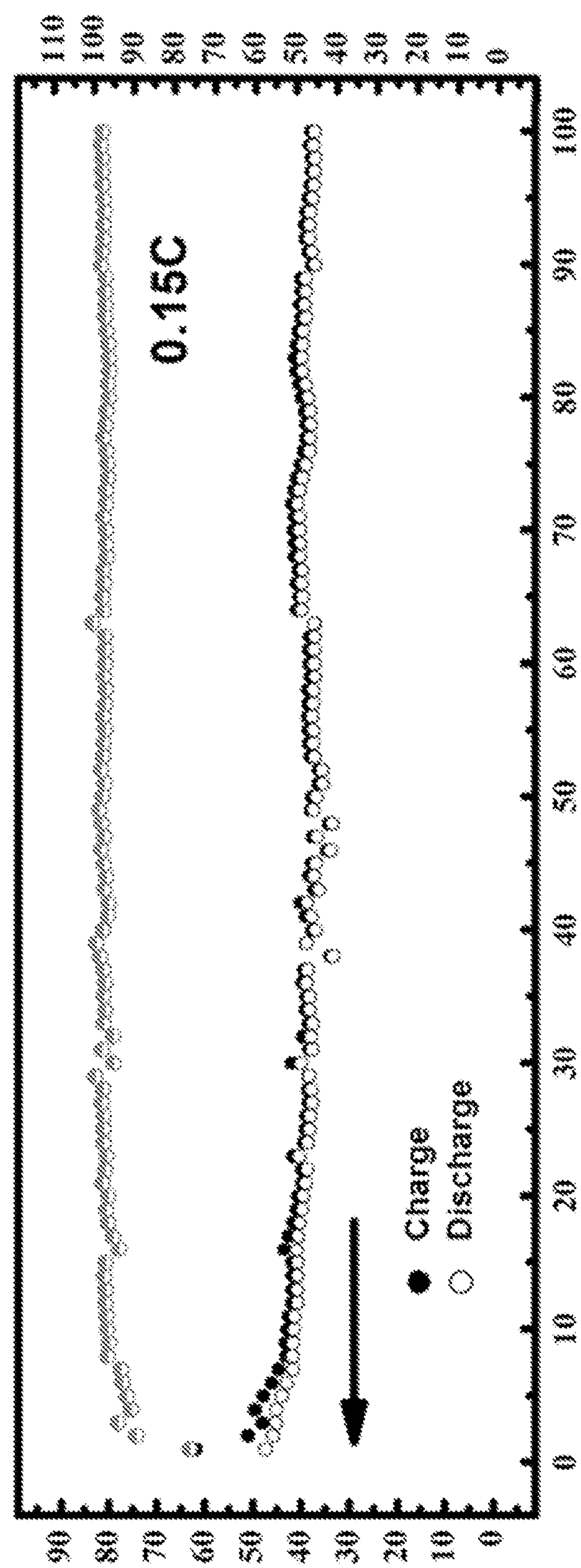
FIG. 12B is a graph depicting the electrochemical performances of $LiMn_2O_4/Mo_3S_4$ full cell in a water-in-salt electrolyte at 0.15 C.

To further evaluate the effect of the water-in-salt electrolyte, a full-cell configuration was employed with $LiMn_2O_4$ as cathode and $Mo_3S_4$ as anode (FIGS. 12A and 12B). Due to the anode irreversibly capacity in the first cycles, the mass ratio of the cathode to the anode in the full-cell was set up about 2:1.

Figure 12C:
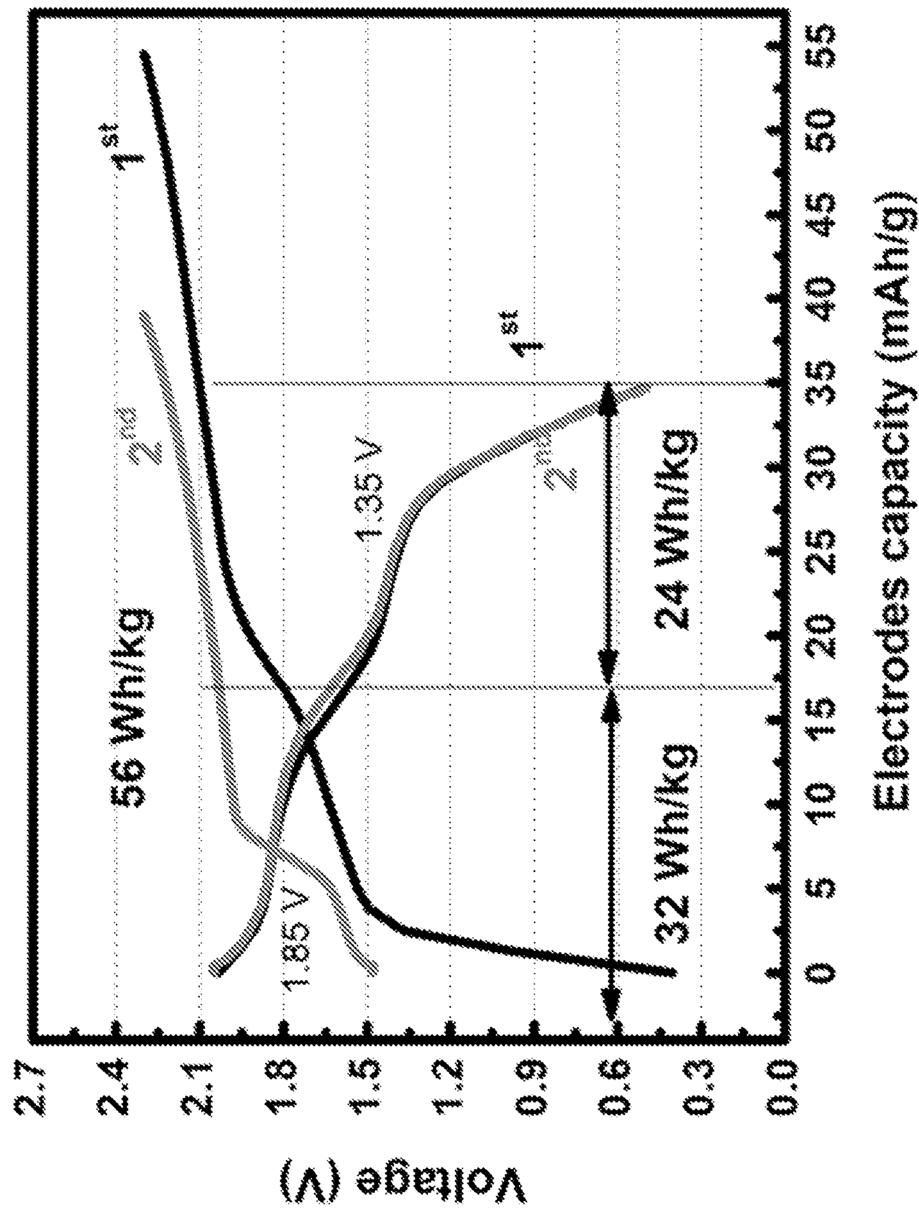
FIG. 12C is a graph depicting the electrochemical performances $LiMn_2O_4/Mo_3S_4$ full cell in a water-in-salt electrolyte at 4.5 C.
Figure 12D:
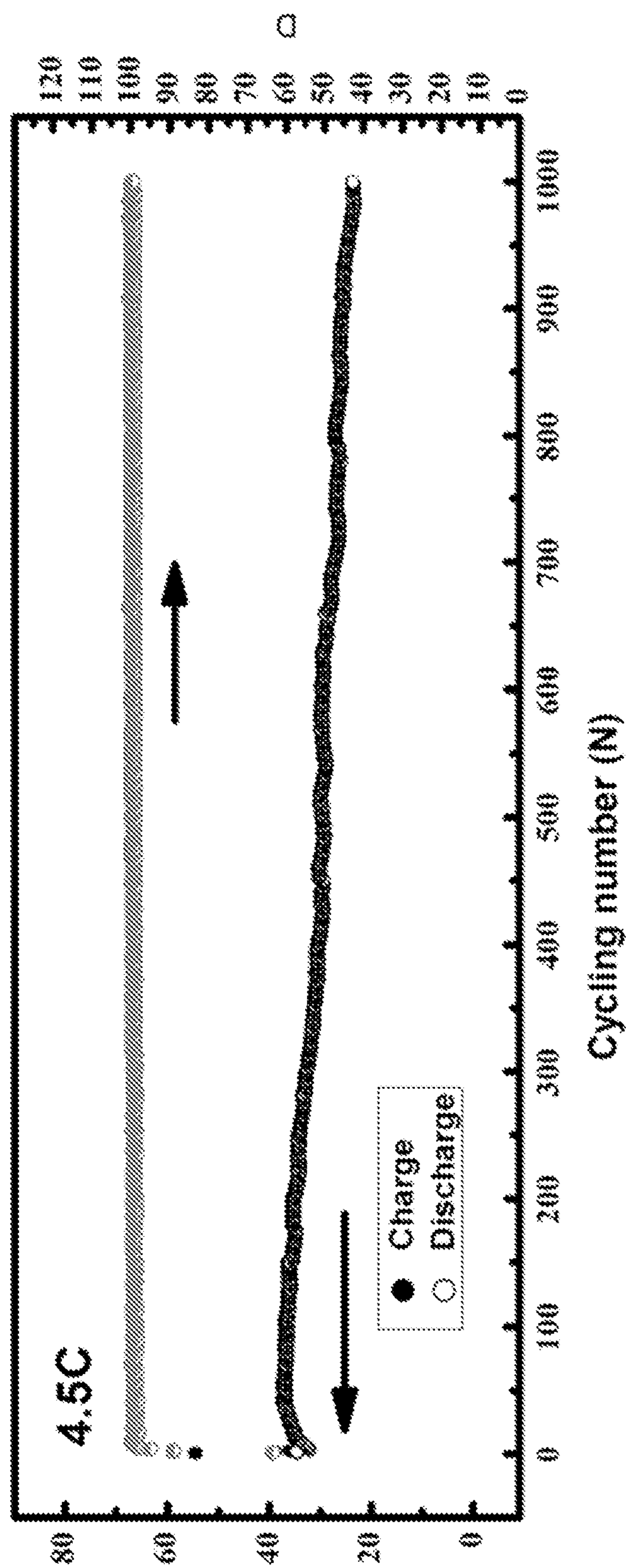
FIG. 12D is a graph depicting the electrochemical performances employing a water-in-salt electrolyte in full cell configuration for the charge-discharge profile at high rate (4.5 C).

As shown in FIGS. 12A and 12C, the full-cell presents two discharge/charge plateaus and average voltage outputs are 1.5 and 2.0 V, respectively. The discharge capacity of the full-cell was achieved at 47 mAh/g calculated using the total electrode weight. Therefore, based on this data, we can roughly estimate that, in this full-cell configuration, the energy density is close to nearly 84 Wh/kg. It is noteworthy that the cycling life of the full-cell is very stable not only at high rate (4.5 C) but also at low rate (0.15 C) which is in striking contrast to previous findings accelerating the charge-discharge rate to prolong cycling life.

Figure 13A:
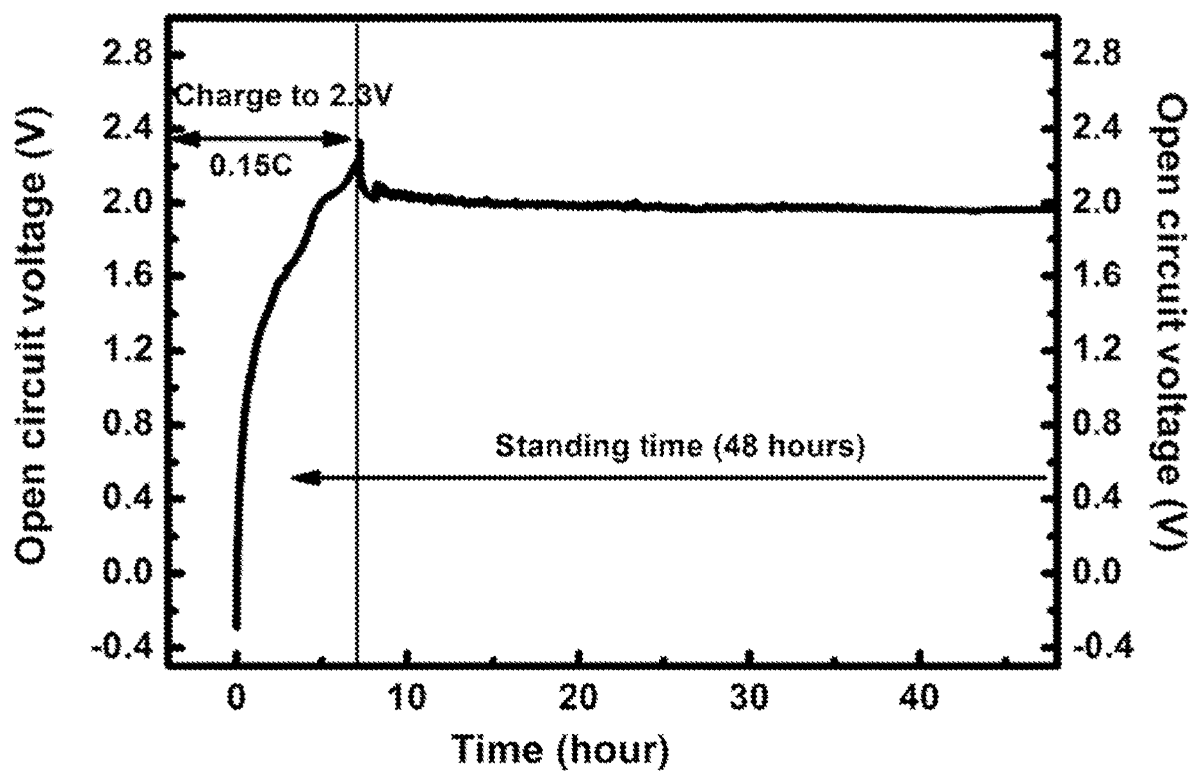
FIG. 13A is a graph showing the open circuit voltage change of a full-cell with times after fully charged to 2.3 V then relaxation.
Figure 13B:
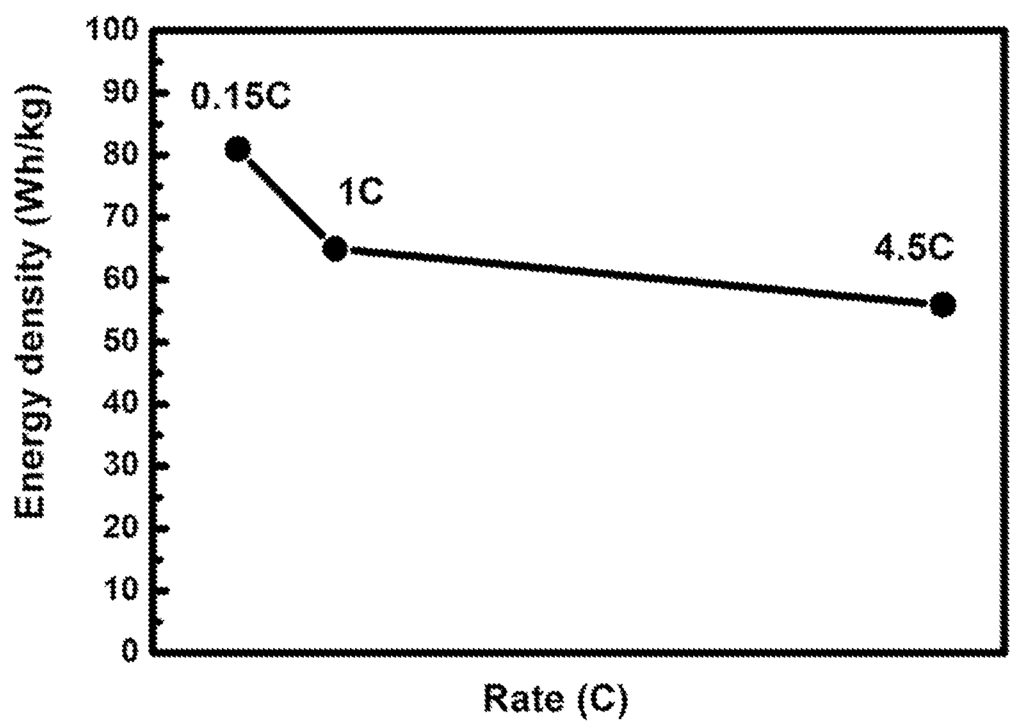
FIG. 13B is a graph showing the energy density of three cells starting at different initial voltages.
Figure 14:
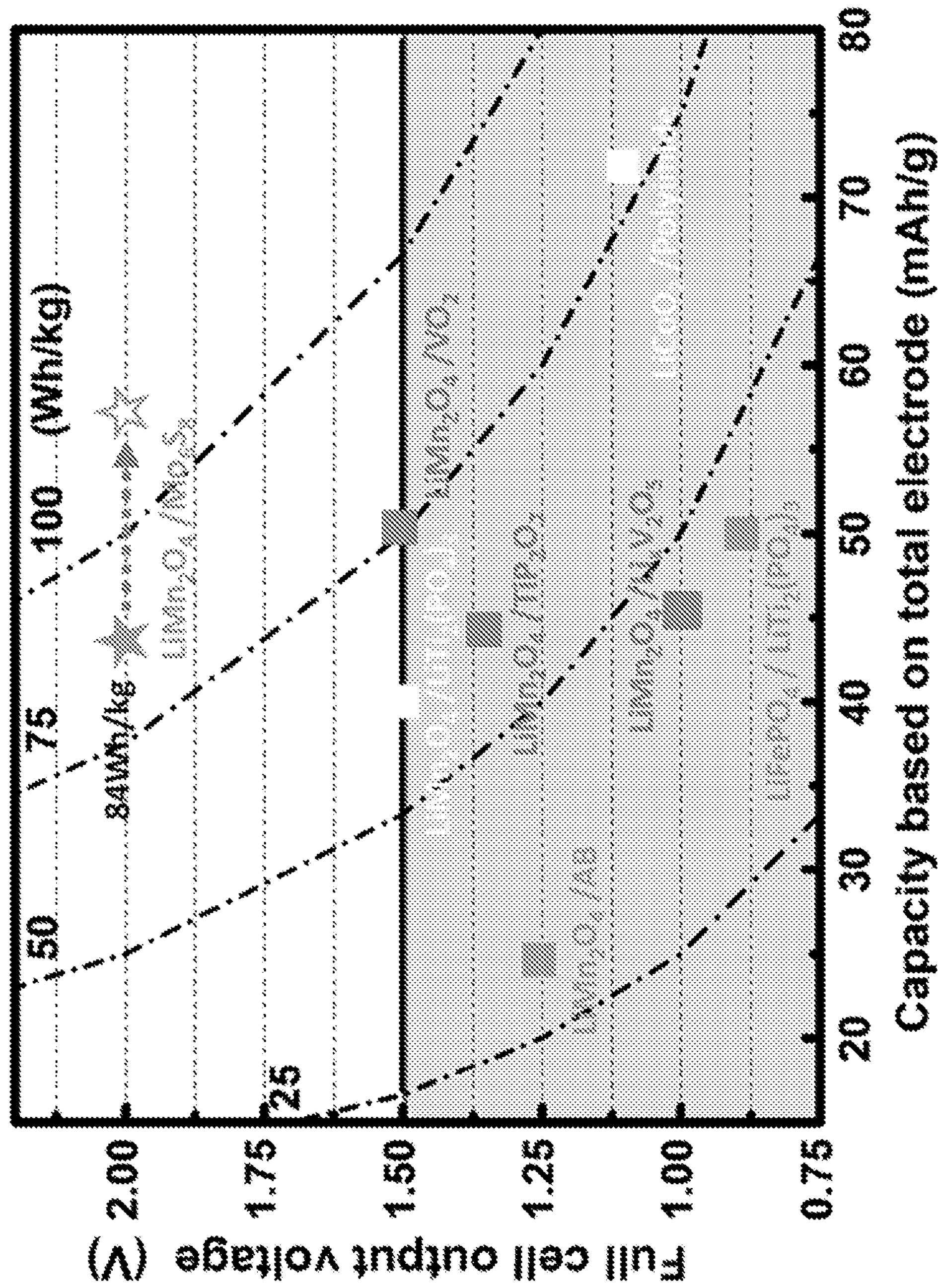
FIG. 14 is a graph showing three performance indexes of full-cell configurations in aqueous lithium ion batteries reported in the literature.

As shown in FIG. 13A, the full-cell is fully charged to 2.3 V, and then the open circuit voltage is recorded versus the standing time to evaluate the self-discharge of full-cell in fully charge. After 2 days, the open circuit voltage is still above 2.0 V which evidently demonstrates low self-discharge and thus, a highly stable electrolyte. Thus, there was hardly any chemical reaction between the full dilithiation anode and electrolyte. In order to avoid consuming excess $LiMn_2O_4$ by the first irreversibly capacity of anode, the $Mo_3S_4$ electrode after 5 cycles in full-cell is selected to match the $Mo_3S_4$ electrode with a mass ratio of 1:1. As shown in FIG. 14, the full-cell delivers a very high energy density of 100 Wh/kg based on discharge capacity (55 mA/g) and two output voltages (1.5 and 2.0 V).

Generally speaking, the four performance parameters used for evaluating the full-cell configuration of an aqueous rechargeable lithium battery include output voltage, capacity based on total electrode, coulombic efficiency, and cycling number. The first two indexes determinate the energy density and the latter two indicate the lifetime of the battery. Here, we summarize those three performance indexes for the full-cell configurations of previously reported aqueous lithium ion batteries in FIG. 14.

The index of cycling life is assigned to previously reported aqueous lithium ion batteries: (1) cycle number N<100 cycles for $LiMn_2O_4NO_2$, $LiMn_2O_4/TiP_2O_7$, and $LiMn_2O_4/Li_xV_2O_5$, (2) cycle number 100<N<200 cycles for $LiMn_2O_4/LiTi_2(PO_4)_3$ and $LiCOO_2$/polyimide; and (3) cycle number of N>1000 cycles for $LiMnO_2O_4$/AB and $LiFePO_4/LiTi_2(PO_4)_3$. To date, only the hybrid batteries $LiMnO_2O_4$/AB and $LiFePO_4/LiTi_2(PO_4)_3$ with eliminating $O_2$ electrolyte, achieved long cycling exceeding 1000 cycles; however, due to sacrificing the energy density, the advantages of aqueous rechargeable lithium batteries are also weakened. With an index of output voltage of about 2.0 V, aqueous lithium ion batteries are more competitive than other kinds of aqueous electrochemical storage systems. With reference to the current lithium ion batteries manufacturing level (inactive substance accounts for at least 40%), the estimated energy density in practical aqueous batteries will deliver above 60 Wh/kg which is not only higher than all current aqueous rechargeable lithium batteries previously reported in the literature, but also shows an obvious advantage in comparison with other aqueous batteries (Ni—H, Pd-acid, with a Wh/kg of about 30-40).

As for the excellent electrochemical performances shown, especially the cycle life at a low rate and open circuit voltage recorded at the fully charge state, it seems not enough just only by contribution to dynamic condition, but possibly the formation of a stable solid electrolyte interphase (SEI) layer on the anode as occurs with organic lithium ion batteries.

Example 4

Figure 15:
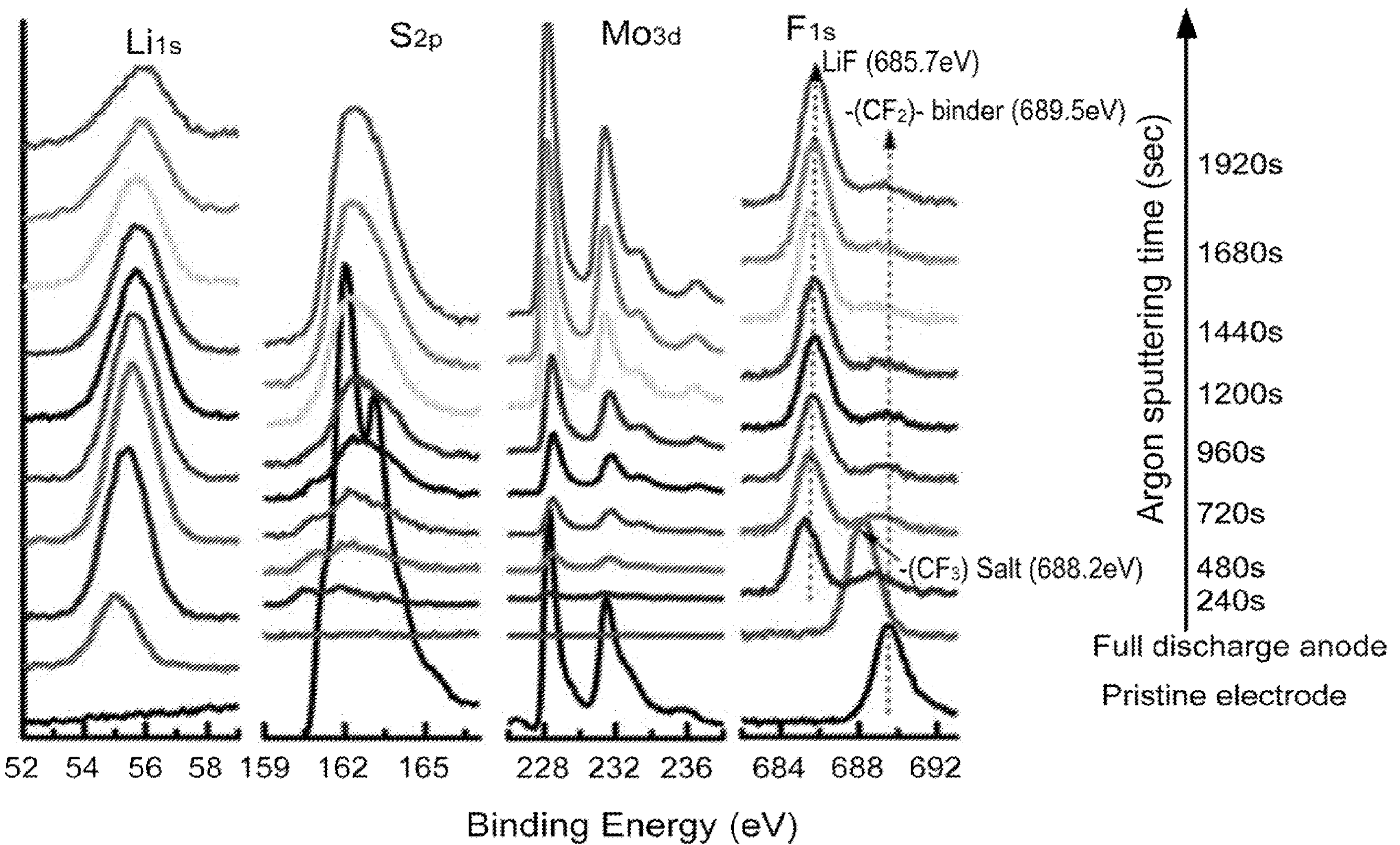
FIG. 15 is X-ray photoelectron spectroscopy (XPS) spectrum of pristine $Mo_3O_4$ and full lithiation state.

To confirm whether a SEI layer formed on the surface of the anode, surfaces of an anode after full lithiation in a full-cell configuration were studied by ex situ X-ray photoelectron spectroscopy (FIG. 15). Compared with the pristine $Mo_3S_4$ electrode with obvious $Mo_{3d}$ and $S_{2p}$ characteristic signals and the F1s signal belonging to a polytetrafluoroethylene (PTFE) binder, after full charge of the full-cell to 2.3 V, the $Mo_{3d}$ and $S_{2p}$ signals of $Mo_3S_4$ disappeared which manifested directly that SEI was forming on the anode. Subsequently, we did depth profiling analysis of the full lithiation anode. It showed that, with increasing argon ion sputtering times, the SEI layer was etched gradually and $Mo_3S_4$ signals enhanced constantly. At the same time, an amount of LiF was detected by XPS which is the main component of the SEI layer.

Figure 16A:
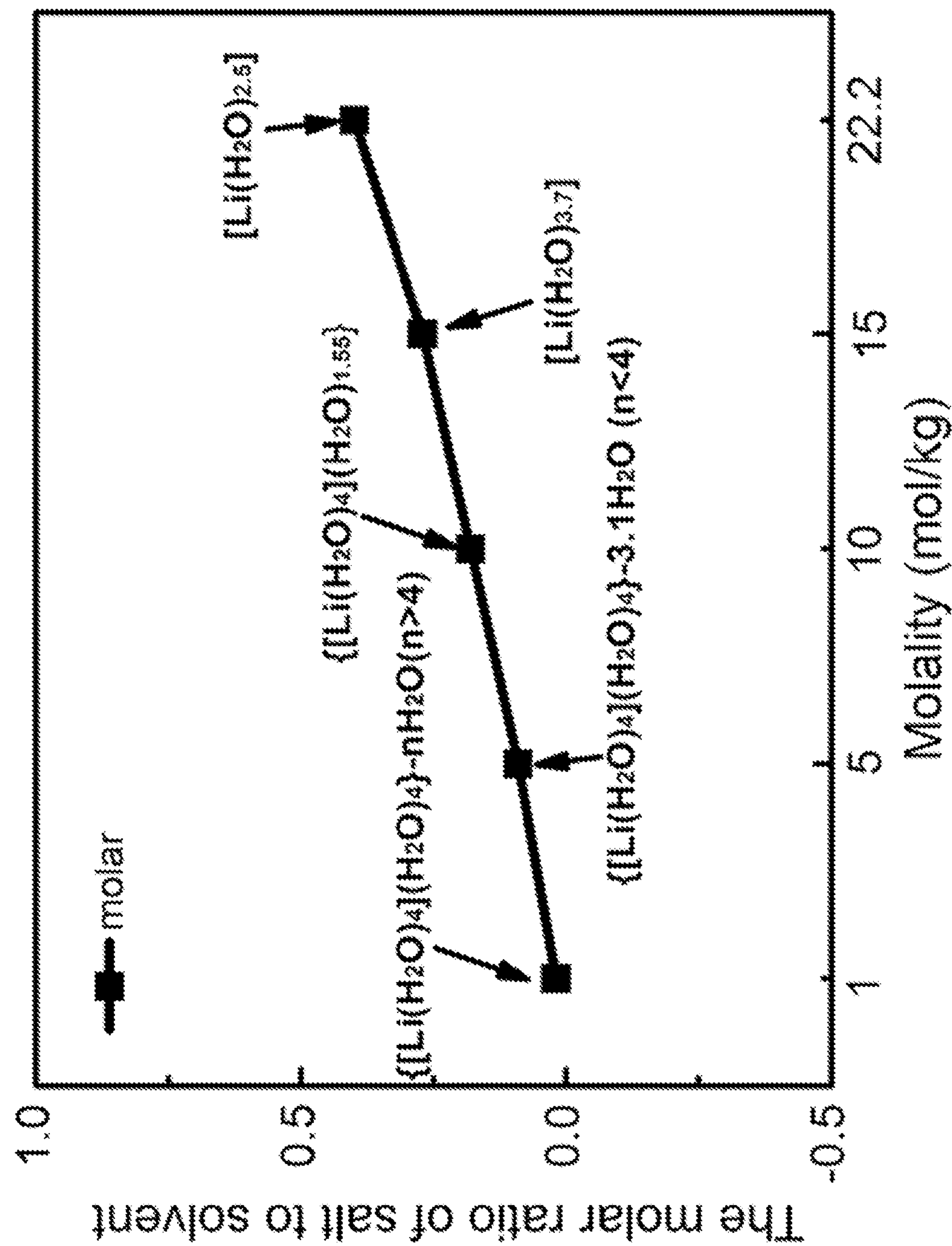
FIG. 16A is a graph showing the molar ratio of salt to solvent and the corresponding hydration ion structure of various electrolytes.
Figure 16B:
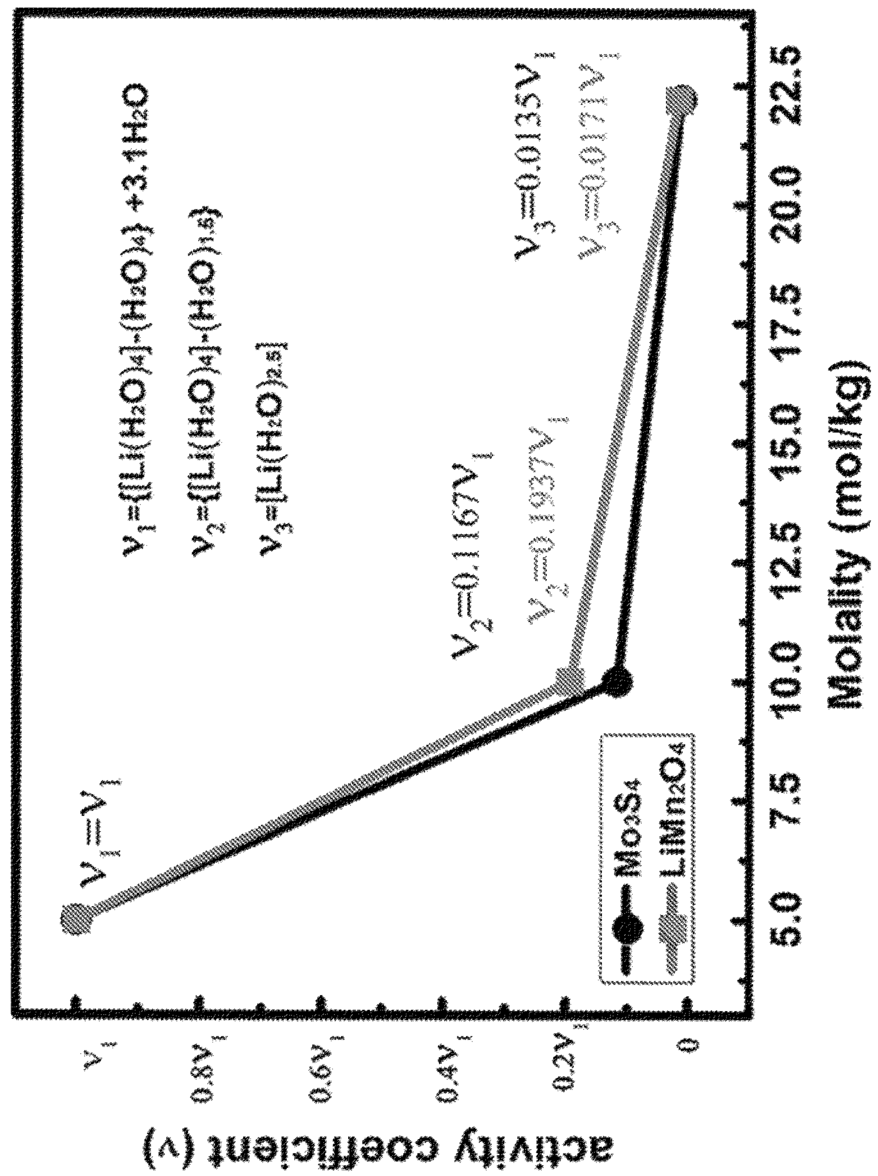
FIG. 16B is a graph showing the relative activity coefficient calculated on the half-cell system with $Mo_3S_4$ as the anode and $LiMn_2O_4$ as the cathode.

As shown by FIGS. 9A-D, FIGS. 10A-C, and FIGS. 11A-B, with the changing salt fractions in solution, the lithium ion activity goes through tremendous changes owing to the effect on the interaction between cation and anion or ion and water. Thus, investigation of the activity coefficients is particularly helpful to understand the behavior of water-in-salt electrolyte solutions. Based on cyclic voltammetry data in FIGS. 10A-C, the relative activity coefficient ratio of different electrolytes was calculated (FIG. 16B).

Example 5

Figure 16C:
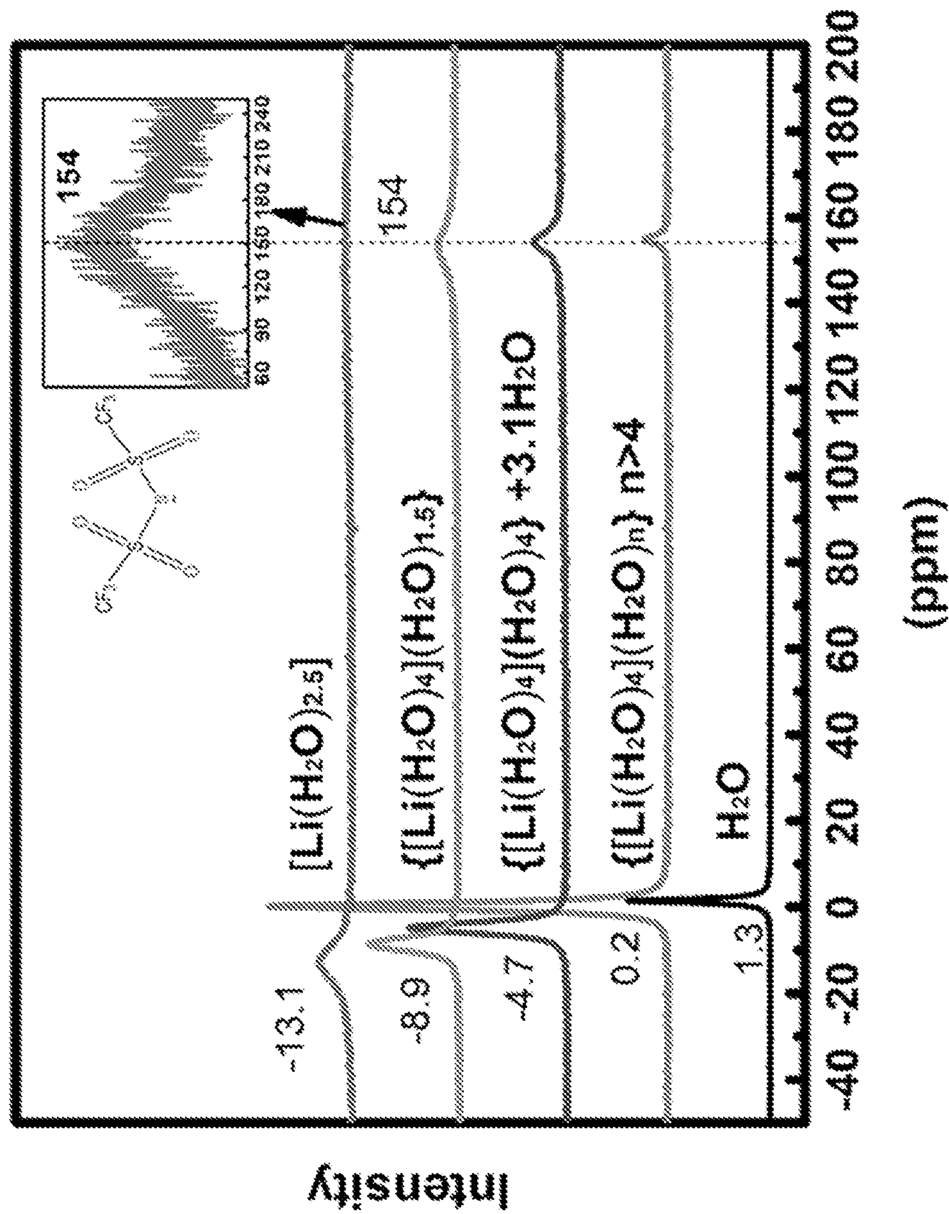
FIG. 16C presents $O^{17}$ NMR spectra for various electrolytes.
Figure 16D:
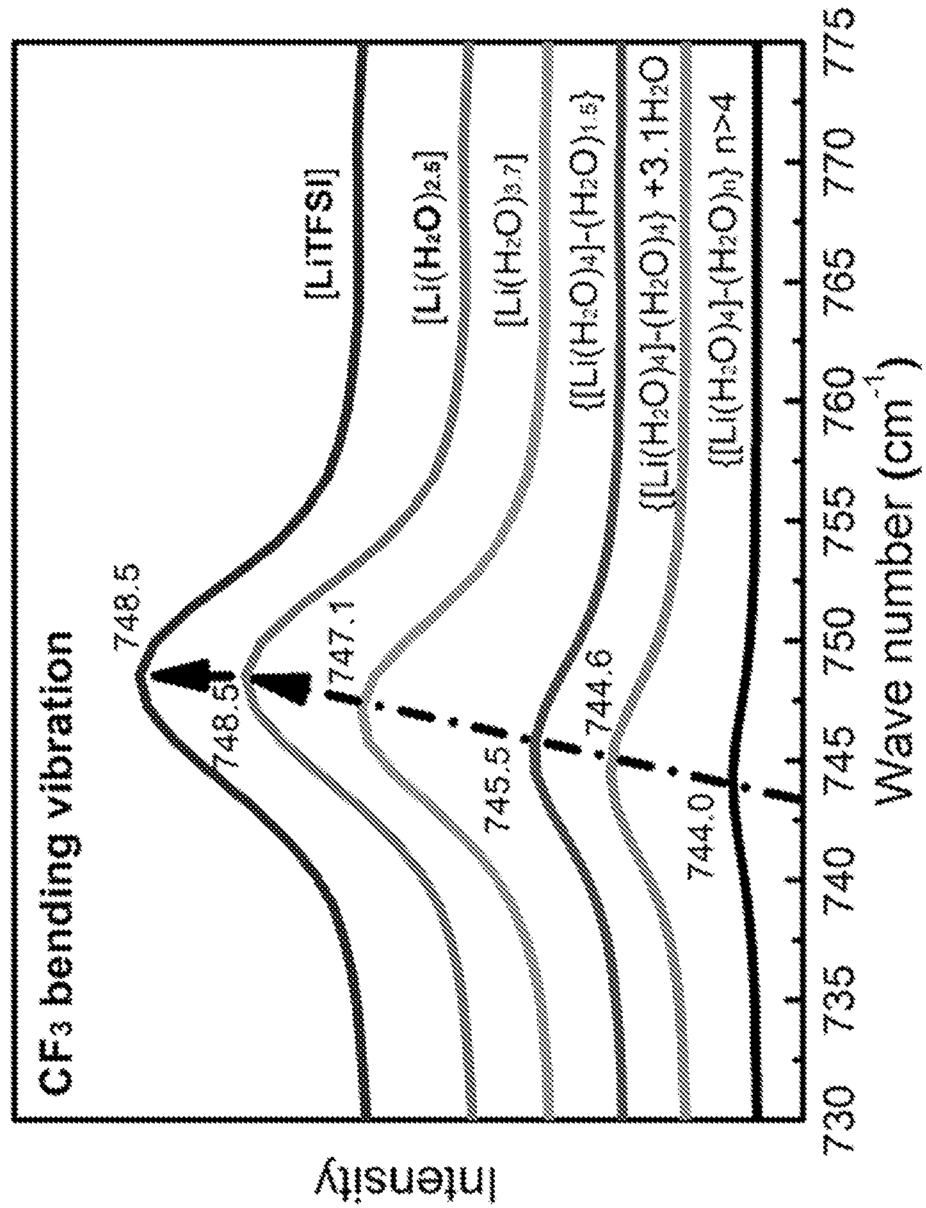
FIG. 16D presents Raman spectra showing the $CF_3$ bending vibration for various electrolytes.
Figure 17A:
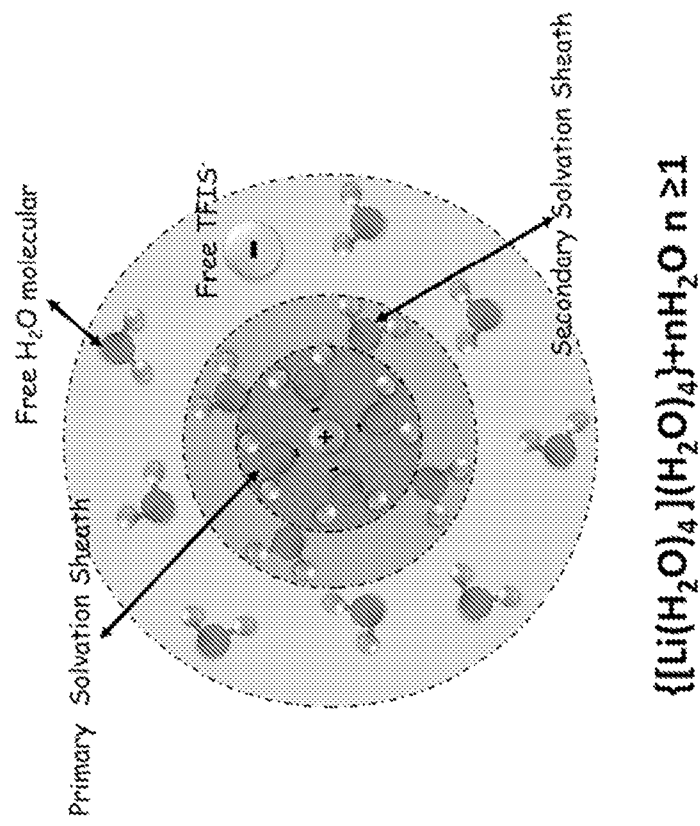
FIG. 17A is a schematic showing the molecular interactions of a solvent-in-water.
Figure 17B:
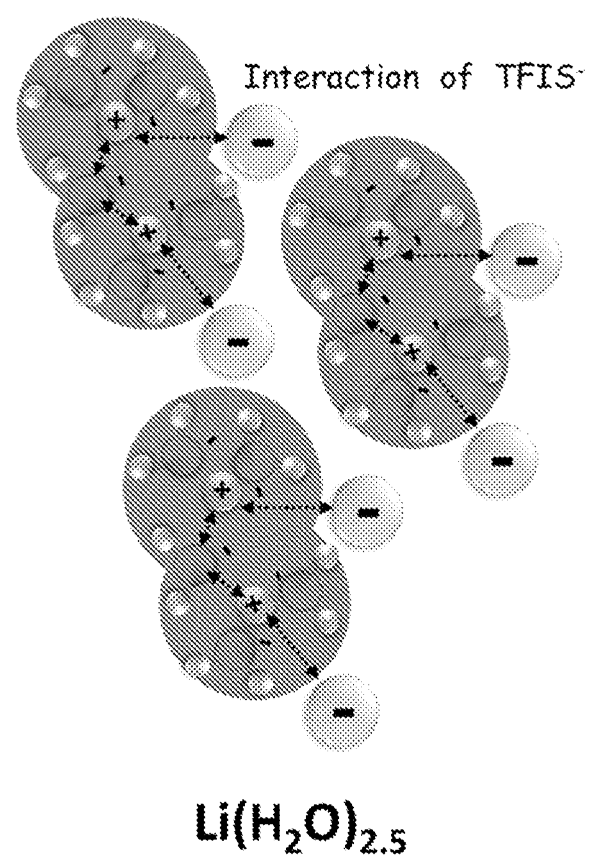
FIG. 17B is a schematic showing the molecular interactions of a water-in-solvent.

In order to investigate the cation-anion or ion-solvent interaction in a LiTFSI—$H_2O$ binary electrolyte system, Raman spectroscopy and $O^{17}$ NMR were applied to study the cation-anion interaction and ion-solvent interaction, respectively. The interaction between cation and anion is detected by Raman spectra of electrolyte with different ratio of LiTFSI to $H_2O$ (FIG. 16D). It is clearly found that the strongest peak is at 747 $cm^{-1}$, corresponding to the bending vibration of the $CF_3$ group. This peak is considered the most evident and sensitive to the change by the ratio of solvent to salt in all peaks, so, it could be used to describe and analyze the interaction between cation and anion. As shown in FIG. 16D, with the increasing ratio of salt to solvent, the peak of the $CF_3$ bending vibration gradually shifted to a high wave number and with the highest intensity belonging to a pure LiTFSI salt which means that interaction of cation and anion becomes stronger and stronger. In solution, the dissolved cation and anion commonly forms ion-pairs. In very dilute solution, due to strong Li hydration, there is nearly no interaction between cation and anion which is defined as a free ion. With an increase in salt concentration, loose pairing occurs because a small amount of anion has a chance to inter with cation hydration. If the ratio of salt to solvent increases more, the intimate pair will play a major role in the electrolyte, thus shifting the Raman peak of $CF_3$ the same as in pure LiTFSI salt.

As shown by $O^{17}$ NMR (FIG. 16C), 154 ppm is considered to belong to the 0 element of TFSI—which is not influenced by the increasing ratio of LiTFSI to water. On the contrary, the signal of $H_2O$ shifted in the negative direction drastically, due to the great change of Li ion hydration structure with increasing ratio of LiTFSI to $H_2O$.

Figure 18:
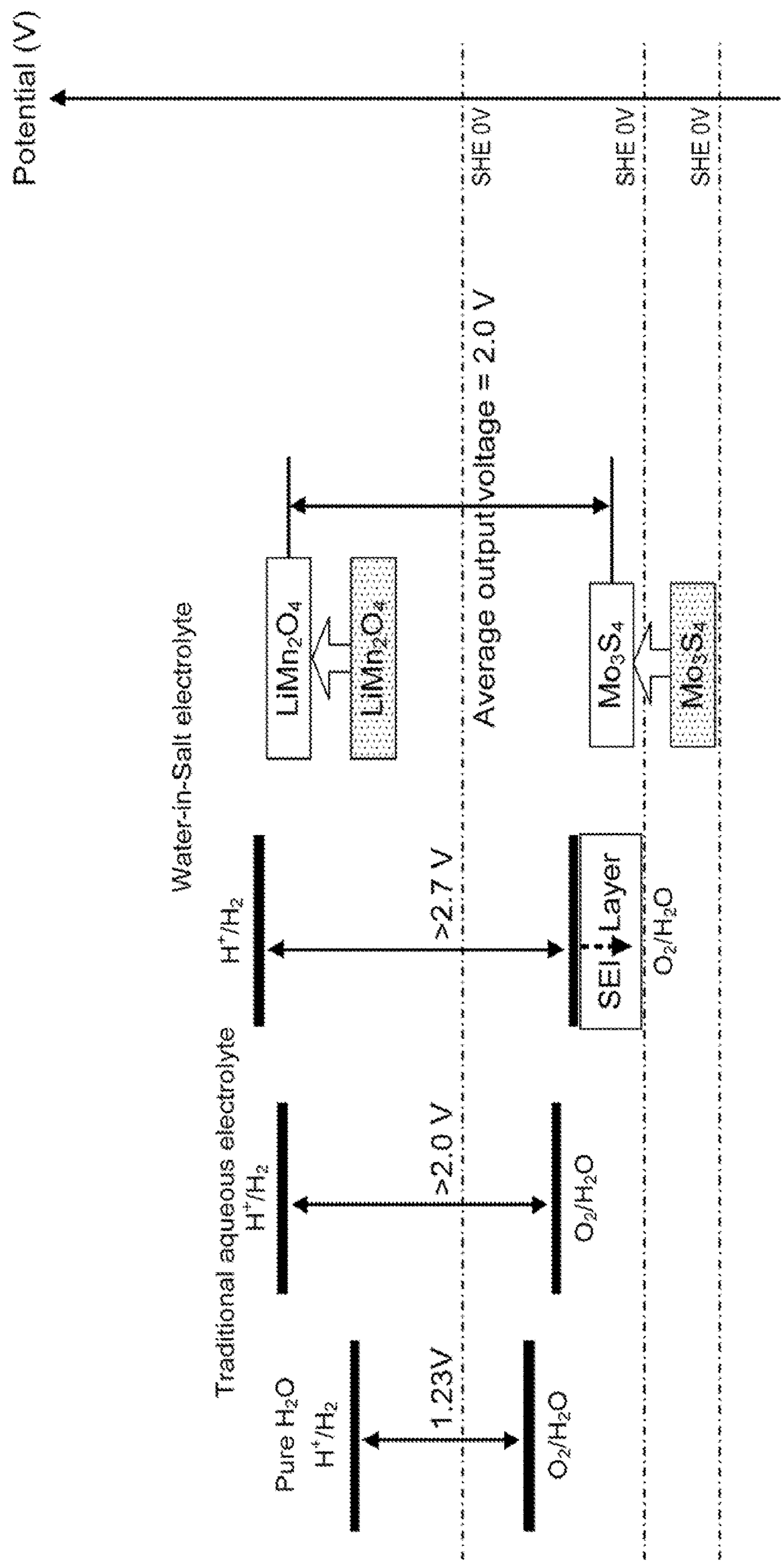
FIG. 18 is a diagram presenting voltage potentials for different electrolytes.

In the conventional view of the hydration Li ion structure in dilute solution (Marcus, Y., et al., *Chemical Reviews* 109(3):1346-1370 (2009) and Ohtaki, H., et al., *Chemical Reviews* 93 (3): 1157-1204 (1993)) (FIGS. 18A-B), there are two shell-sheaths surrounding Li ion, and every sheath is comprised of four water molecules which is similar to the lithium ion organic electrolyte (Bogle, X., et al., *J. Physical Chem. Letters* 4(10):1664-1668 (2013)). However, in the water-in-salt electrolyte at 22.2 M, the ratio of LiTFSI to water is 2.5, which is not enough to from a hydration structure with 4 ordination number. Thus, in this case, the Li electrostatic field cannot be shielded by $H_2O$ molecules which causes the direct interaction between $Li^+$ and $TFSI^-$, which could be considered as contact ion pairs (CIP) and cation-anion aggregates (AGG).

It is generally accepted that SEI is unable to form in an aqueous electrolyte due to $H_2O$ decomposition into gas ($O_2$ and $H_2$) which cannot contribute to SEI formation and salt reduction potential lower than $H_2O$ hydrogen evolution. To our knowledge, this is the first work reporting stable SEI formation in an aqueous rechargeable lithium battery which could extend the aqueous electrolyte window into −1.3 V in a neural electrolyte.

The origin of SEI formation was derived from two factors: (1) the high solvation energy of $H_2O$-in-LiTFSI effectively reduced the gas product of water decomposition ($O_2$ and $H_2$) which is favorable to make salt decomposition products adhere to the surface of the anode; and (2) the strong interaction between cation and anion formed a large amount of contact ion pairs (CIP) and cation-anion aggregates (AGG) in electrolyte which had a higher reduction potential (2.4 V) than free $TFSI^-$ (1.8 V) in low concentration solution. Thus, salt decomposed to form a stable SEI layer in the charge-discharge process.

Having now fully described this invention, it will be understood by those of ordinary skill in the art that the same can be performed within a wide and equivalent range of conditions, formulations and other parameters without affecting the scope of the invention or any embodiment thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

All patents and publications cited herein are fully incorporated by reference herein in their entirety.

We claim:

1. An electrochemical cell comprising:

(a) an anode comprising $Mg_2Ni$;

(b) a cathode comprising $Mg_{0.5}AOOH$, wherein A is Mn, Co, Ni, or Fe; and (c) a stable electrolyte composition comprising water and a sulfone salt, wherein the molality of the sulfone salt in the electrolyte is at least 20 m.

2. The electrochemical cell of claim 1, wherein A is Mn, Co or Ni.

3. The electrochemical cell of claim 1, wherein A is Mn or Ni.

4. The electrochemical cell of claim 1, wherein the sulfone salt is $LiN(SO_2CF_3)_2$.

5. The electrochemical cell of claim 1, wherein the volume percentage of water in the electrolyte composition relative to the total solvent volume is between 30% and 100%.

6. The electrochemical cell of claim 1, wherein the volume percentage of water in the electrolyte composition relative to the total solvent volume is between 40% and 100%.

7. The electrochemical cell of claim 1, wherein the electrolyte composition has a pH between 6 and 9.

8. The electrochemical cell of claim 1, wherein the cell has an operating temperature between −40° C. and 100° C.

9. The electrochemical cell of claim 1, wherein the cell has an operating temperature between −40° C. and 70° C.

10. The electrochemical cell of claim 1, wherein the cell has a full cell voltage output between 1.5 V and 4.0 V.

11. The electrochemical cell of claim 1, wherein the cell has a full cell voltage output between 1.8 V and 4.0 V.

12. An electrochemical cell comprising:

(a) an anode comprising $Mg_2Ni$;

(b) a cathode comprising $Mg_{0.5}AOOH$, wherein A is metal or an alloy of a metal; and (c) a stable aqueous electrolyte comprising a sulfone salt, wherein the molality of the sulfone salt in the aqueous electrolyte is at least 20 m.

13. The electrochemical cell of claim 1, wherein the volume percentage of water in the aqueous electrolyte relative to the total solvent volume is 100%.

14. The electrochemical cell of claim 12, wherein the pH of the aqueous electrolyte is between 6 and 9.

15. The electrochemical cell of claim 1, wherein said electrochemical cell has more than 1000 cycle life at 80% depth of discharge.

16. The electrochemical cell of claim 1, wherein said electrochemical cell has energy density of greater than 60 Wh/kg.

17. The electrochemical cell of claim 1, wherein said sulfone salt is selected from the group consisting of $LiN(SO_2CF_3)_2$, $LiN(SO_2CH_3)_2$, $LiN(SO_2C_4H_9)_2$, $LiN(SO_2C_2F_5)_2$, $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$, and $LiN(SO_2F)(SO_2CF_3)$.

18. An electrochemical cell comprising:

(a) an anode comprising $Mg_2Ni$;

(b) a cathode comprising $Mg_{0.5}NiOOH$; and (c) a stable electrolyte composition comprising water and a sulfone salt, wherein the molality of the sulfone salt in the electrolyte is at least 20 m.

19. The electrochemical cell of claim 18, wherein said stable electrolyte composition is a water-in-salt composition.

* * * * *